United States Patent
Oue et al.

(10) Patent No.: US 8,340,878 B2
(45) Date of Patent: Dec. 25, 2012

(54) TORQUE CONVERTER CONTROL DEVICE AND CONTROL METHOD THEREOF

(75) Inventors: Tomoko Oue, Fukuroi (JP); Morimasa Yamawaki, Yokohama (JP); Kouichi Sawano, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 863 days.

(21) Appl. No.: 12/484,568

(22) Filed: Jun. 15, 2009

(65) Prior Publication Data
US 2009/0312925 A1 Dec. 17, 2009

(30) Foreign Application Priority Data
Jun. 16, 2008 (JP) .................................. 2008-156973

(51) Int. Cl.
*G06F 7/00* (2006.01)
*B60K 23/02* (2006.01)
*G06F 17/00* (2006.01)

(52) U.S. Cl. ............... 701/67; 701/51; 701/58; 477/70; 477/79

(58) Field of Classification Search ................... 701/51, 701/58, 65, 64, 66, 67, 68, 87; 477/34, 62, 477/70, 77, 79, 97, 174
See application file for complete search history.

(56) References Cited

U.S. PATENT DOCUMENTS

| 5,733,223 | A  | * | 3/1998 | Matsubara et al. | 477/175 |
| 2002/0077218 | A1 | * | 6/2002 | Segawa et al. | 477/176 |
| 2003/0195084 | A1 | * | 10/2003 | Tabata | 477/168 |
| 2004/0092362 | A1 |   | 5/2004 | Ayabe et al. |  |

FOREIGN PATENT DOCUMENTS

| EP | 1 452 781 A2 | 9/2004 |
| JP | 6-101755 A | 4/1994 |
| JP | 11-190424 A | 7/1999 |

* cited by examiner

*Primary Examiner* — Christine Behncke
(74) *Attorney, Agent, or Firm* — Foley & Lardner LLP

(57) ABSTRACT

When an upshift is performed while a traveling condition of a vehicle corresponds to a driving condition or a downshift is performed while the traveling condition of the vehicle corresponds to a coasting condition, a second target slip amount is set as a target slip amount for a period extending from the start of gear ratio variation following issuance of a gear position change start command to completion of the gear ratio change, and when a downshift is performed in the driving condition or an upshift is performed in the coasting condition, a first target slip amount is set as the target slip amount for a period extending from issuance of the shift command to completion of the shift.

13 Claims, 18 Drawing Sheets

TORQUE CONVERTER CONTROL DEVICE AND CONTROL METHOD THEREOF

TECHNICAL FIELD OF THE INVENTION

This invention relates to a torque converter control device.

BACKGROUND OF THE INVENTION

In a conventional automatic transmission described in JP6-101755A, a duty ratio between an Nth speed duty ratio and an N+1th speed duty ratio is varied continuously during a shift between an Nth speed and an N+1th speed. Further, when a shift is performed from the Nth speed to the N+1th speed, a slip condition of a lockup clutch is varied gradually. Thus, engine racing and falling occurring when the lockup clutch is temporarily disengaged during the shift and engagement shock that may occur in the lockup clutch when the lockup clutch is engaged thereafter are suppressed.

SUMMARY OF THE INVENTION

However, in the invention described above, a target slip rotation speed is not changed in accordance with a traveling condition of a vehicle (a driving condition or a coasting condition, for example) and operating conditions of the vehicle (whether the shift is an upshift or a downshift, the type of gear position to be switched, a throttle opening, and so on). Therefore, depending on differences in the traveling condition, the operating conditions, and so on, problems such as rapid engine racing, rapid engine falling, and engagement shock may occur.

This invention has been invented to solve this problem, and it is an object thereof to suppress rapid engine racing, rapid engine falling, and engagement shock.

According to an aspect of the present in invention, a torque converter control device for controlling a torque converter that is interposed between an engine and an automatic transmission and includes a lockup clutch is provided. The torque converter control device includes a traveling condition determining unit that determines whether a traveling condition of a vehicle corresponds to a driving condition or a coasting condition, a shift command determining unit that determines whether or not a shift is underway in the automatic transmission, a first target slip amount calculating unit that calculates a first target slip amount having a larger absolute value than an absolute value of a target slip amount of the torque converter immediately before a shift command is issued when a shift is underway in the automatic transmission, a first engine rotation speed variation rate regulation value calculating unit that calculates, on the basis of an operating condition of the vehicle, a first engine rotation speed variation rate regulation value, which is a regulation value of a variation amount in an engine rotation speed per unit time, when a shift is underway in the automatic transmission, a second target slip amount calculating unit that calculates a second target slip amount on the basis of the first engine rotation speed variation rate regulation value when a shift is underway in the automatic transmission, a first final target slip amount setting unit that sets the first target slip amount or the second target slip amount as a final target slip amount when a shift is underway in the automatic transmission. and a control unit that controls an engagement condition of the lockup clutch on the basis of the final target slip amount. When a gear position is changed to a High side in the driving condition and when the gear position is changed to a Low side in the coasting condition, the first final target slip amount setting unit sets the second target slip amount as the final target slip amount for a period extending from the start of gear ratio variation following issuance of a gear position change start command to the automatic transmission to completion of the gear position change, and when the gear position is changed to the Low side in the driving condition and when the gear position is changed to the High side in the coasting condition, the first final target slip amount setting unit sets the first target slip amount as the final target slip amount for a period extending from issuance of a change command to the automatic transmission to completion of the change.

According to another aspect of the present invention, a control method for controlling a torque converter that is interposed between an engine and an automatic transmission and includes a lockup clutch is provided. The method includes determining whether a traveling condition of a vehicle corresponds to a driving condition or a coasting condition, determining whether or not a shift is underway in the automatic transmission, calculating a first target slip amount having a larger absolute value than an absolute value of a target slip amount of the torque converter immediately before a shift command is issued when a shift is underway in the automatic transmission, calculating, on the basis of an operating condition of the vehicle, a first engine rotation speed variation rate regulation value, which is a regulation value of a variation amount in an engine rotation speed per unit time, when a shift is underway in the automatic transmission, calculating a second target slip amount on the basis of the first engine rotation speed variation rate regulation value when a shift is underway in the automatic transmission, setting the first target slip amount or the second target slip amount as a final target slip amount when a shift is underway in the automatic transmission. and controlling an engagement condition of the lockup clutch on the basis of the final target slip amount. When a gear position is changed to a High side in the driving condition and when the gear position is changed to a Low side in the coasting condition, the second target slip amount is set as the final target slip amount for a period extending from the start of gear ratio variation following issuance of a gear position change start command to the automatic transmission to completion of the gear position change, and when the gear position is changed to the Low side in the driving condition and when the gear position is changed to the High side in the coasting condition, the first target slip amount is set as the final target slip amount for a period extending from issuance of a change command to the automatic transmission to completion of the change.

According to these aspects, when the gear position is changed to the High side while the traveling condition of the vehicle corresponds to the driving condition and when the gear position is changed to the Low side while the traveling condition corresponds to the coasting condition, the second target slip amount calculated on the basis of the first engine rotation speed variation rate regulation value is set as the final target slip amount from the start to the end of the gear position change. Further, when the gear position is changed to the Low side while the traveling condition corresponds to the driving condition and when the gear position is changed to the High side while the traveling condition corresponds to the coasting condition, the first target slip amount is set as the final target slip amount from issuance of the gear position change command to completion of the gear position change. Thus, rapid racing and rapid falling in the engine, which may occur during the shift, and engagement shock can be suppressed.

The details as well as other features and advantages of these aspects are set forth in the remainder of the specification and are shown in the accompanying drawings.

DESCRIPTION OF THE PREFERRED EMBODIMENTS

An embodiment of this invention will be described in detail below with reference to the figures and so on.

Figure 1:
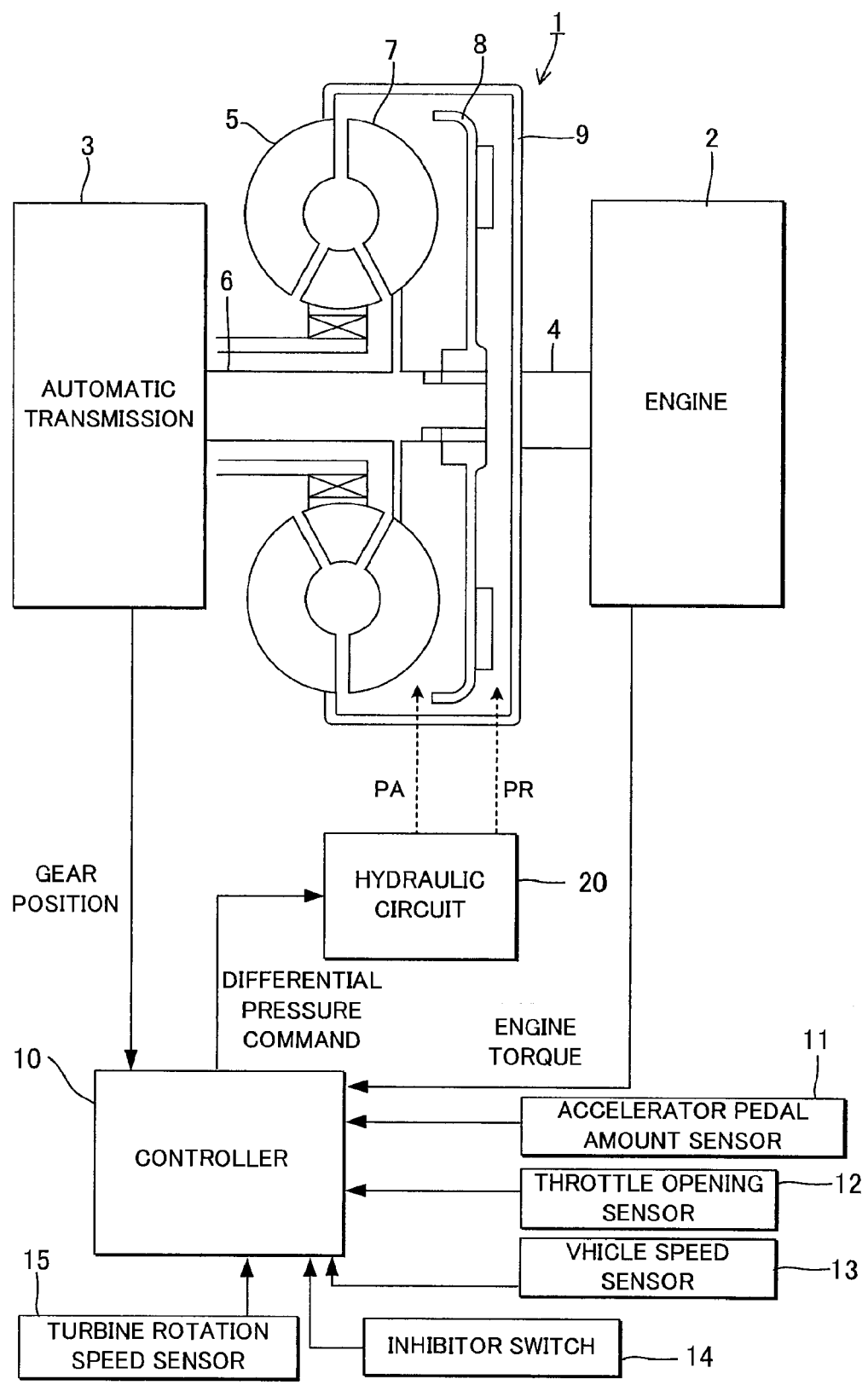
FIG. 1 is a schematic constitutional diagram of a lockup clutch control device for an automatic transmission according to an embodiment of this invention.

FIG. 1 is a schematic constitutional diagram of a torque converter control device according to this embodiment. A torque converter 1 is interposed between an engine 2 and an automatic transmission 3 to transmit a driving force of the engine 2 to the automatic transmission 3 via a fluid. A pump impeller 5 connected to an output shaft 4 of the engine 2 and a turbine runner 7 connected to an input shaft 6 of the automatic transmission 3 are disposed in the torque converter 1 so as to face each other. When the pump impeller 5 rotates in accordance with rotation of the engine 2, a fluid (ATF) charged into the interior of the torque converter 1 flows, and as a result, the turbine runner 7 rotates.

Further, a lockup clutch 8 that is connected to the input shaft 6 of the automatic transmission 3 and rotates together with the turbine runner 7 is provided on an inner side of a front cover 9 connected to the output shaft 4 of the engine 2 and formed integrally with the pump impeller 5. When the lockup clutch 8 is engaged to the pump impeller 5, an input element and an output element of the torque converter 1 are directly coupled, thereby becoming incapable of relative rotation, and as a result, the lockup clutch 8 enters a full lockup condition. Further, when the input element and output element are set in a half-engaged condition, a slip lockup condition, in which slippage occurs between the input element and the output element, is established. When the lockup clutch 8 is fully disengaged, an unlocked condition is established.

The lockup clutch 8 operates in accordance with a differential pressure between a torque converter apply pressure PA and a torque converter release pressure PR acting on either side thereof. When the release pressure PR is higher than the apply pressure PA, the lockup clutch 8 is disengaged, and when the release pressure PR is lower than the apply pressure PA, the lockup clutch 8 is engaged.

A torque that can be transmitted by the lockup clutch 8 of the torque converter 1, which is dependent on an engaging force of the lockup clutch 8, or in other words a lockup capacity, is determined in accordance with the aforementioned differential pressure. The differential pressure is controlled on the basis of a target slip amount Tslip calculated by a controller. The target slip amount Tslip is a rotation speed difference between the input element and output element of the torque converter 1, and as a the target slip amount Tslip increases, the differential pressure decreases, leading to a reduction in the engaging force of the lockup clutch 8.

A controller 10 receives an accelerator pedal operation amount, a throttle opening TVO, a vehicle speed, a selected position signal, and a turbine rotation speed Nt from an accelerator pedal operation amount sensor 11, a throttle opening sensor 12, a vehicle speed sensor 13, an inhibitor switch 14, and a turbine rotation speed sensor 15, respectively, and calculates the target slip amount Tslip of the lockup clutch 8 on the basis of these values as well as an engine torque Te and a gear position. Further, the controller 10 calculates a differential pressure command value on the basis of the calculated target slip amount Tslip and informs a hydraulic circuit 20 for controlling an oil pressure supplied to the lockup clutch 8 of the differential pressure command value. It should be noted that lockup clutch control is not performed in ranges other than a D range and an M range.

The unlocked condition, slip lockup condition, and full lockup condition, which constitute the engagement conditions of the lockup clutch 8, are determined on the basis of operating conditions defined by the vehicle speed and the throttle opening TVO.

Figure 2:
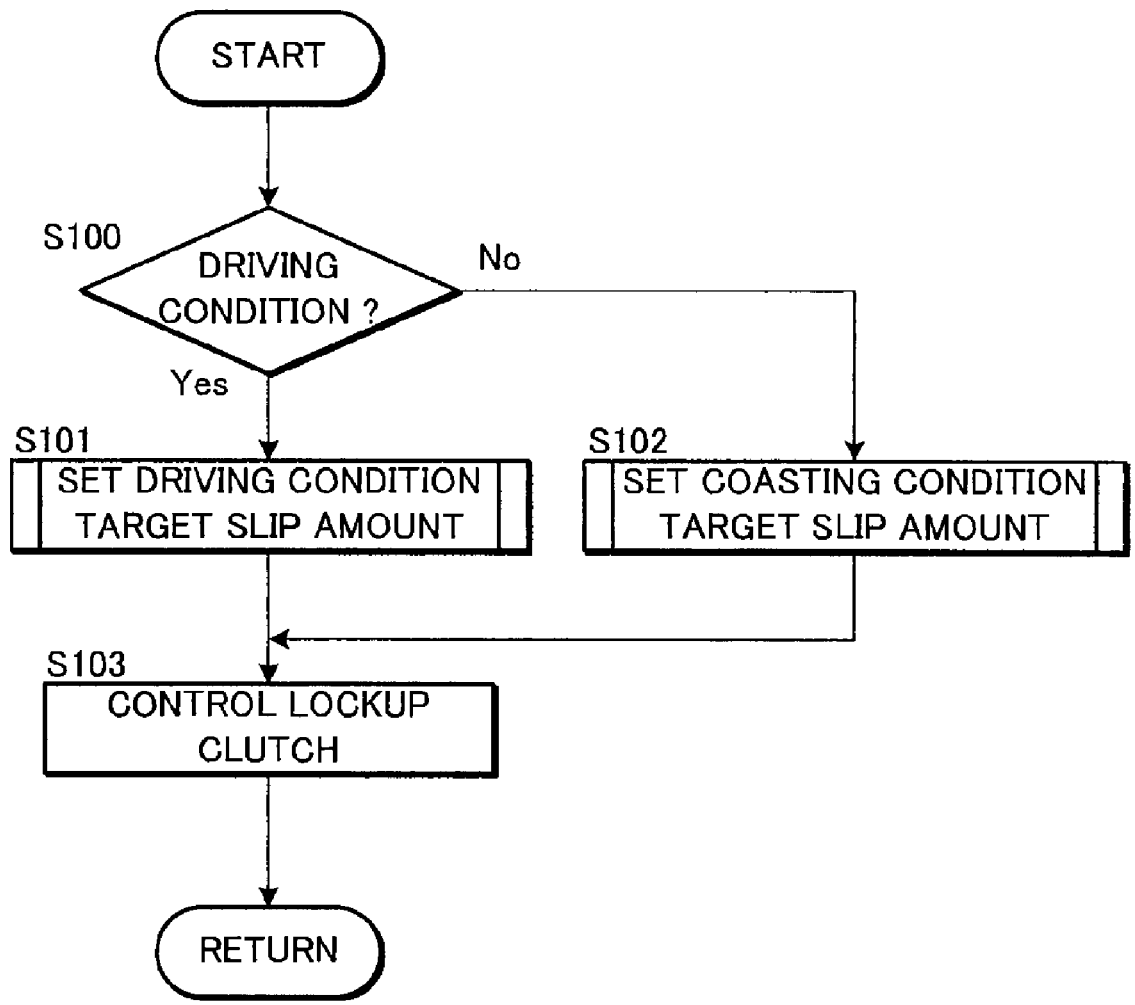
FIG. 2 is a flowchart illustrating lockup clutch control according to this embodiment.

Next, control of the lockup clutch 8 during a gear position switch will be described using the flowchart in FIG. 2. It should be noted that this control is executed every 20 ms, for example.

In a step S100, a determination is made as to whether or not a traveling condition of the vehicle corresponds to a driving condition in which an accelerator pedal is depressed. When the vehicle traveling condition corresponds to the driving condition, the routine advances to a step S101, and when the vehicle traveling condition corresponds to a coasting condition in which the accelerator pedal is not depressed, the routine advances to a step S102.

In the step S101, the target slip amount Tslip in the driving condition is set through control to be described in detail below. Further, in the step S102, the target slip amount Tslip in the coasting condition is set through control to be described in detail below.

In a step S103, the differential pressure of the lockup clutch 8 is controlled on the basis of the set target slip amount Tslip, whereby the engagement condition of the lockup clutch 8 is controlled.

Figure 3:
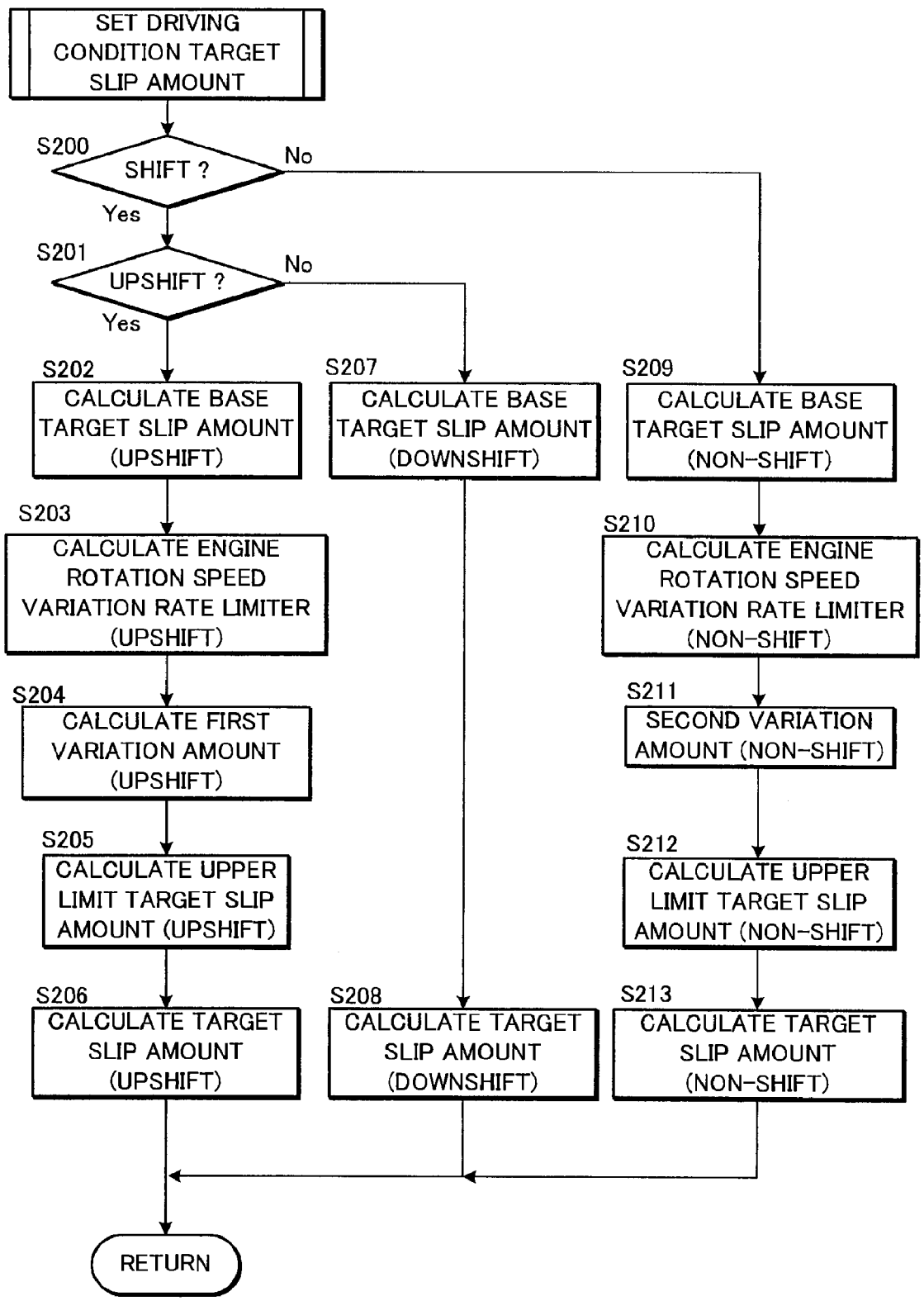
FIG. 3 is a flowchart for setting a target slip amount of a driving condition in the flowchart of FIG. 2.

Here, a method of setting the target slip amount Tslip in the driving condition in the step S101 will be described using the flowchart in FIG. 3.

In a step S200, a determination is made as to whether or not a shift is underway in the automatic transmission 3. When the shift is underway, the routine advances to a step S201, and when the shift is not underway, the routine advances to a step S209.

In the step S201, a determination is made as to whether or not the shift is an upshift (change of the gear position to a High side). When the shift is the upshift, the routine advances to a step S202. When the shift is not the upshift, or in other words, when the shift is a downshift (change of the gear position to a Low side), the routine advances to a step S207.

Figure 4:
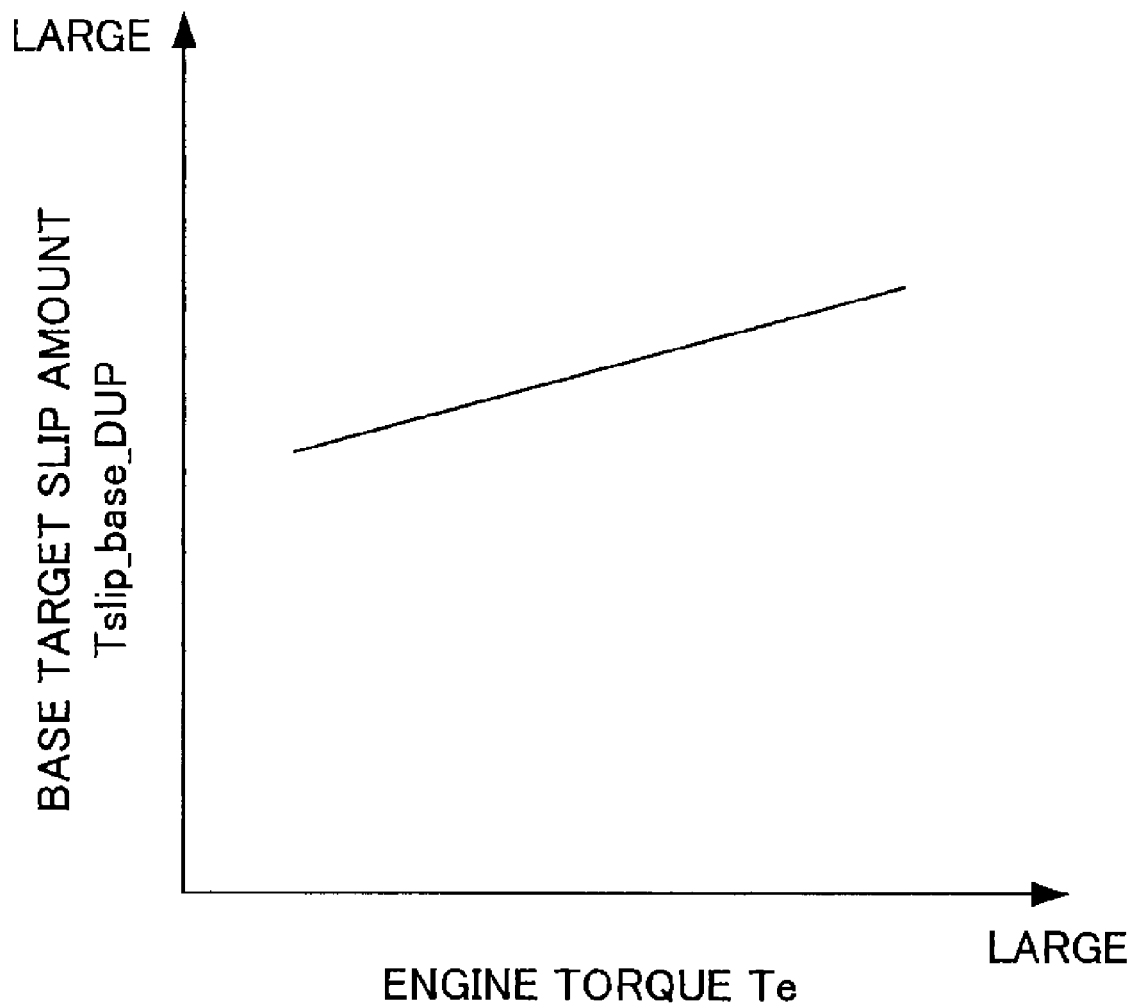
FIG. 4 is a map for calculating a base target slip amount according to this embodiment.

In the step S202, the engine torque Te is detected, and an upshift base target slip amount (first target slip amount) Tslip_base_DUP is calculated on the basis of a map shown in FIG. 4. FIG. 4 is a map showing a relationship between the engine torque Te and the base target slip amount Tslip_base_DUP. The base target slip amount Tslip_base_DUP takes a larger value than a slip amount immediately before the shift is performed, and is set such that a rotation speed difference between an engine rotation speed Ne and the turbine rotation speed Nt is larger than the rotation speed difference immediately before the shift is performed.

In FIG. 4, when the engine torque Te increases, the base target slip amount Tslip_base_DUP increases. When an upshift is performed in the driving condition, shift shock generated during the shift increases as an engine load increases, and therefore, by increasing the base target slip amount Tslip_base_DUP as the engine torque Te increases, shift shock can be reduced.

Figure 5:
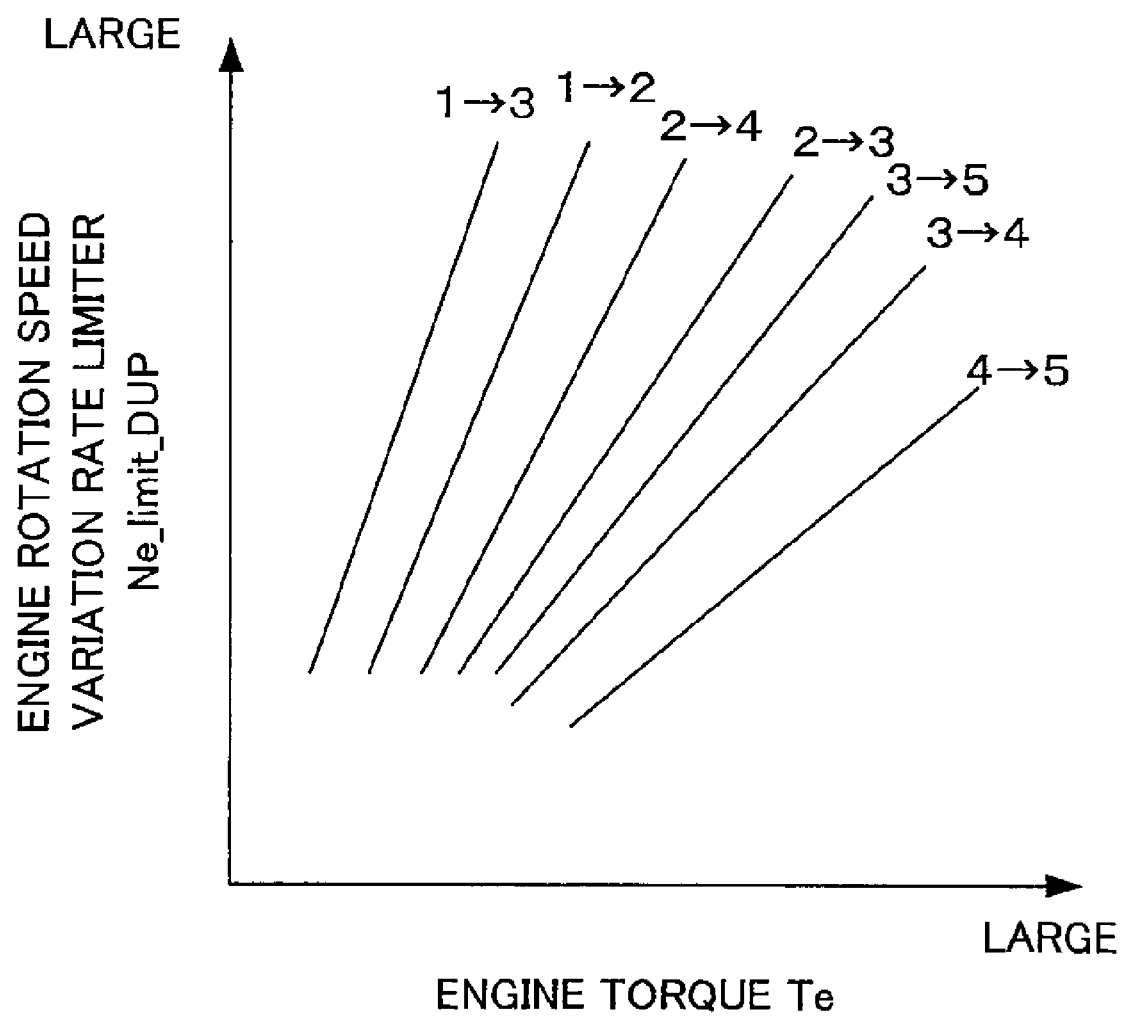
FIG. 5 is a map for calculating an engine rotation speed variation rate limiter according to this embodiment.

In a step S203, a shift type, i.e. the gear position type before and after the shift, is calculated, whereupon an upshift engine rotation speed variation rate limiter (first engine rotation speed variation rate regulation value) Ne_limit_DUP is calculated from the shift type and the engine torque Te on the basis of a map shown in FIG. 5. FIG. 5 is a map showing a relationship between the shift type, the engine torque Te, and the engine rotation speed variation rate limiter Ne_limit_DUP. The engine rotation speed variation rate limiter Ne_limit_DUP represents a maximum value of a reduction rate of the engine rotation speed Ne. Accordingly, a decreasing direction of the engine rotation speed Ne is set as a positive direction and an increasing direction of the engine rotation speed Ne is set as a negative direction. During an upshift in the driving condition, the variation rate of the engine rotation speed approaches zero as the engine rotation speed variation rate limiter Ne_limit_DUP decreases.

In FIG. 5, the engine rotation speed variation rate limiter Ne_limit_DUP increases as the engine torque Te increases. Further, the engine rotation speed variation rate limiter Ne_limit_DUP increases as the gear position at the start of the shift decreases (becomes the Low side) and increases as the gear position following the shift increases (becomes the High side). When variation in the engine rotation speed Ne during change of the gear position increases, the slip amount can be reduced quickly once the shift is complete by increasing the engine rotation speed variation rate limiter Ne_limit_DUP. In other words, by increasing variation in the engine rotation speed Ne, a predetermined slip condition can be attained quickly following the shift.

In a step S204, an input rotation speed InpREV input into the automatic transmission 3 is added to the base target slip amount Tslip_base_DUP calculated in the step S202. Further, the added value is subtracted from a target engine rotation speed Ne_target' of a previous control routine, whereby a first variation amount Nedlt_base_DUP, which is an amount of variation in the engine rotation speed per unit time at the base target slip amount Tslip_base_DUP, is calculated.

In a step S205, the smaller of the engine rotation speed variation rate limiter Ne_limit_DUP calculated in the step S203 and the first variation amount Nedlt_base_DUP calculated in the step S204 is calculated as an engine rotation speed variation amount Ne_dlt.

Next, a target engine rotation speed Ne_target of the current control routine is calculated by subtracting the engine rotation speed variation amount Ne_dlt from the target engine rotation speed Ne_target' of the previous control routine. Further, the target engine rotation speed Ne_target calculated in the current control routine is stored as a target engine rotation speed Ne_target' for use in the next control routine.

Further, an upper limit target slip amount (second target slip amount) Tslip_limit_DUP is calculated by subtracting the input rotation speed InpREV input into the automatic transmission 3 from the target engine rotation speed Ne_target.

In a step S206, the larger of the upper limit target slip amount Tslip_limit_DUP and the base target slip amount Tslip_base_DUP is set as the target slip amount (first final target slip amount) Tslip.

In this embodiment, the base target slip amount Tslip_base_DUP takes a larger value than the upper limit target slip amount Tslip_limit_DUP between issuance of a shift command and the actual start of the gear position switch, and therefore the base target slip amount Tslip_base_DUP is selected as the target slip amount Tslip. When the gear position switch actually starts, the upper limit target slip amount Tslip_limit_DUP takes a larger value, and therefore the upper limit target slip amount Tslip_limit_DUP is selected as the target slip amount Tslip.

When an upshift is performed in the driving condition, the engine rotation speed Ne shifts in accordance with variation in the turbine rotation speed Nt. Accordingly, a rapid fall in the engine rotation speed may occur. Hence, when the gear position is changed in this embodiment, the occurrence of a rapid fall in the engine rotation speed can be suppressed by setting the target slip amount Tslip at the upper limit target slip amount Tslip_limit_DUP.

During a shift, the target slip amount Tslip is calculated on the basis of the variation rate of the engine rotation speed Ne. Hence, the engine rotation speed Ne varies smoothly during slip control of the lockup clutch 8, leading to an improvement in operability.

Figure 6:
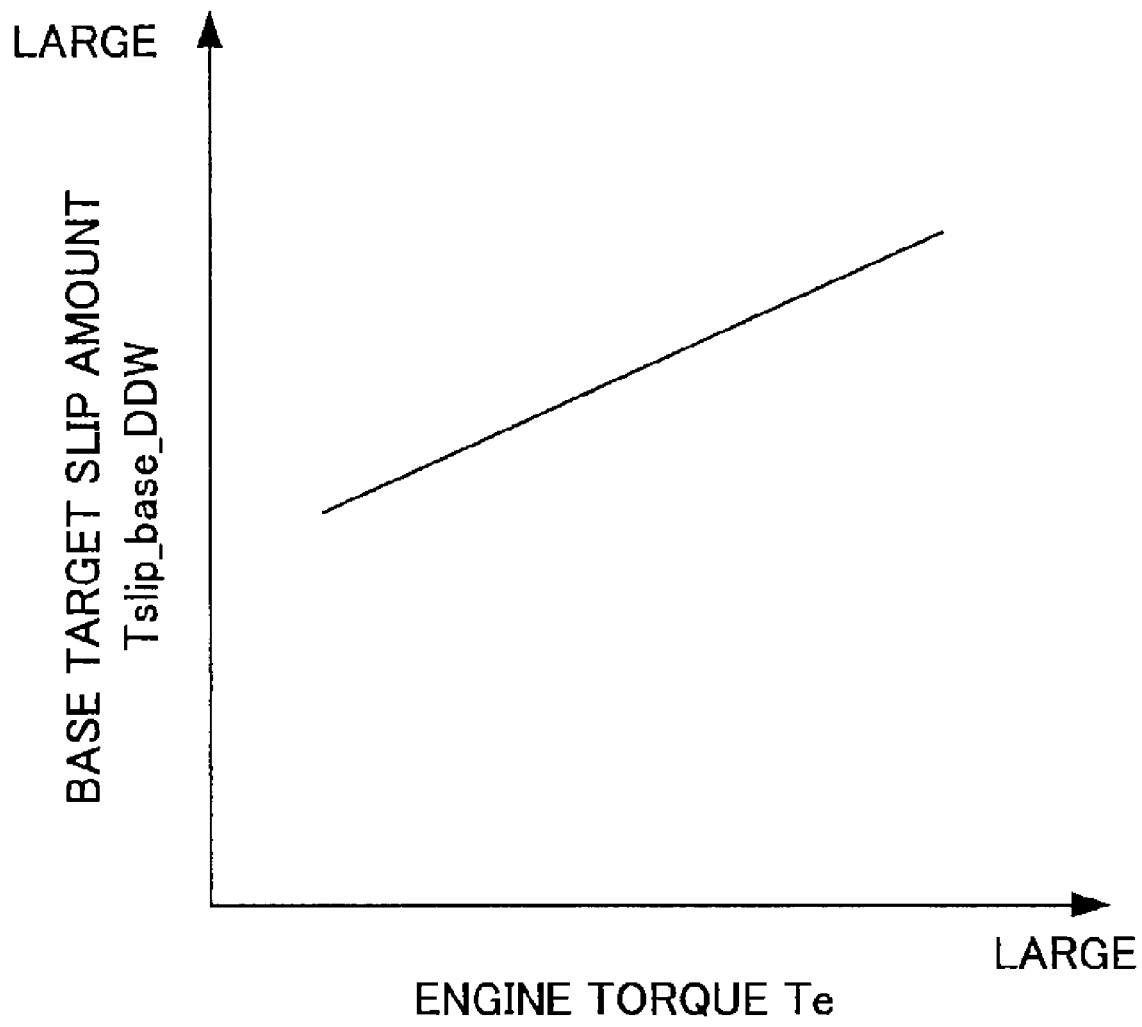
FIG. 6 is a map for calculating the base target slip amount according to this embodiment.

When it is determined that the shift is a downshift in the step S201, a downshift base target slip amount Tslip_base_DDW is calculated in the step S207 from the engine torque Te on the basis of a map shown in FIG. 6. FIG. 6 is a map showing a relationship between the engine torque Te and the base target slip amount Tslip_base_DDW. In FIG. 6, the base target slip amount Tslip_base_DDW increases as the engine torque Te increases. The base target slip amount Tslip_base_DDW takes a larger value than the target slip amount immediately before the shift.

An increase rate of the gear ratio during the shift increases as the engine load increases. Hence, by increasing the base target slip amount Tslip_base_DDW as the engine load increases, the lockup clutch 8 can be set in the slip condition reliably during the shift, and as a result, shift shock can be suppressed.

In a step S208, the base target slip amount Tslip_base_DDW calculated in the step S207 is calculated as the target slip amount Tslip during a downshift.

Figure 7:
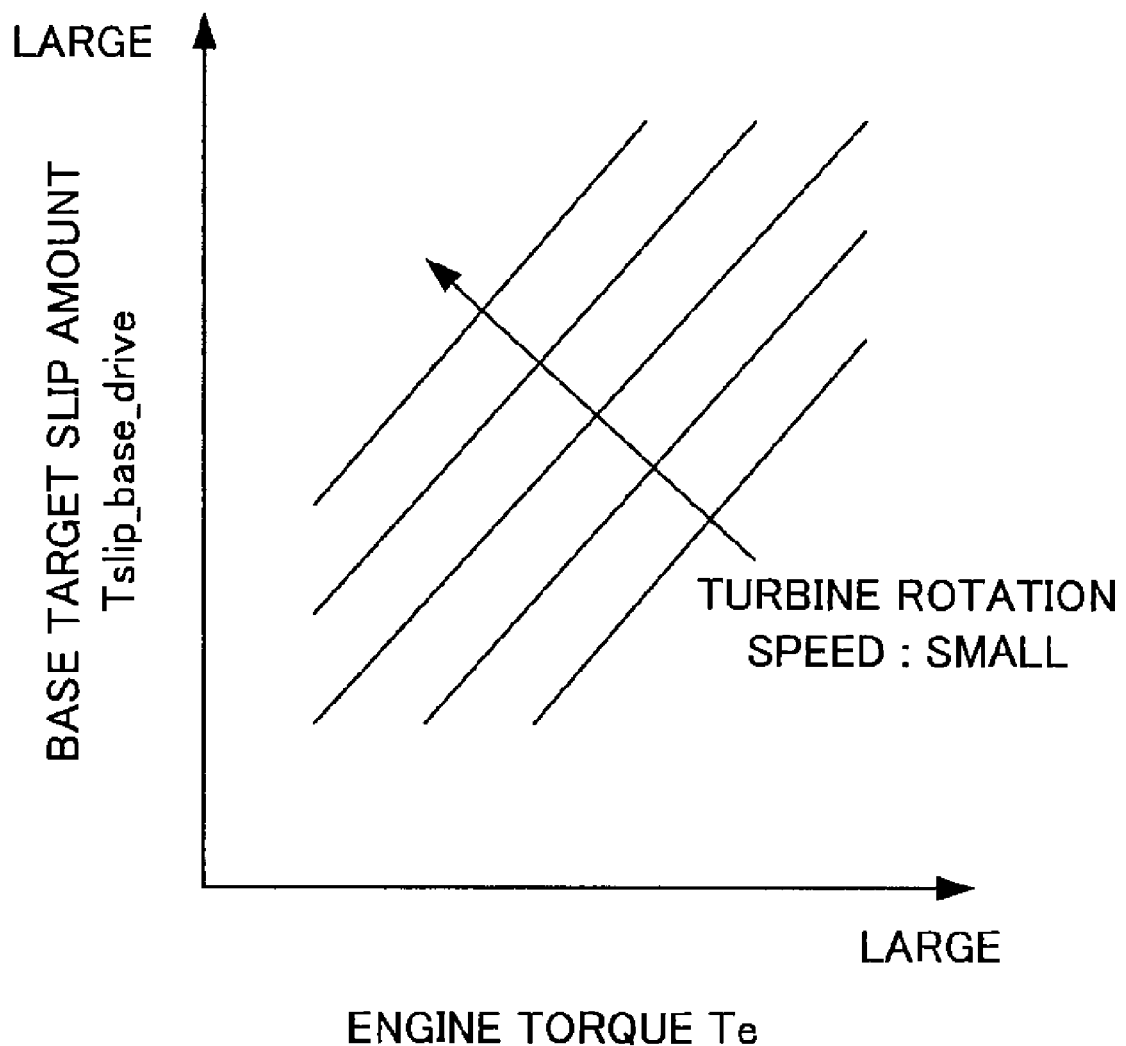
FIG. 7 is a map for calculating the base target slip amount according to this embodiment.

When it is determined in the step S200 that a shift is not underway, a non-shift base target slip amount (third target slip amount) Tslip_base_drive is calculated in the step S209 from the engine torque Te and the turbine rotation speed Nt on the basis of a map shown in FIG. 7. FIG. 7 is a map showing a relationship between the engine torque Te, the turbine rotation speed Nt, and the base target slip amount Tslip_base_drive. In FIG. 7, the base target slip amount Tslip_base_drive increases as the engine torque Te increases. Further, the base target slip amount Tslip_base_drive increases as the turbine rotation speed Nt decreases.

By increasing the base target slip amount Tslip_base_drive as the engine torque Te, or in other words the engine load, increases or as the turbine rotation speed Nt decreases, muffled noise can be suppressed.

Figure 8:
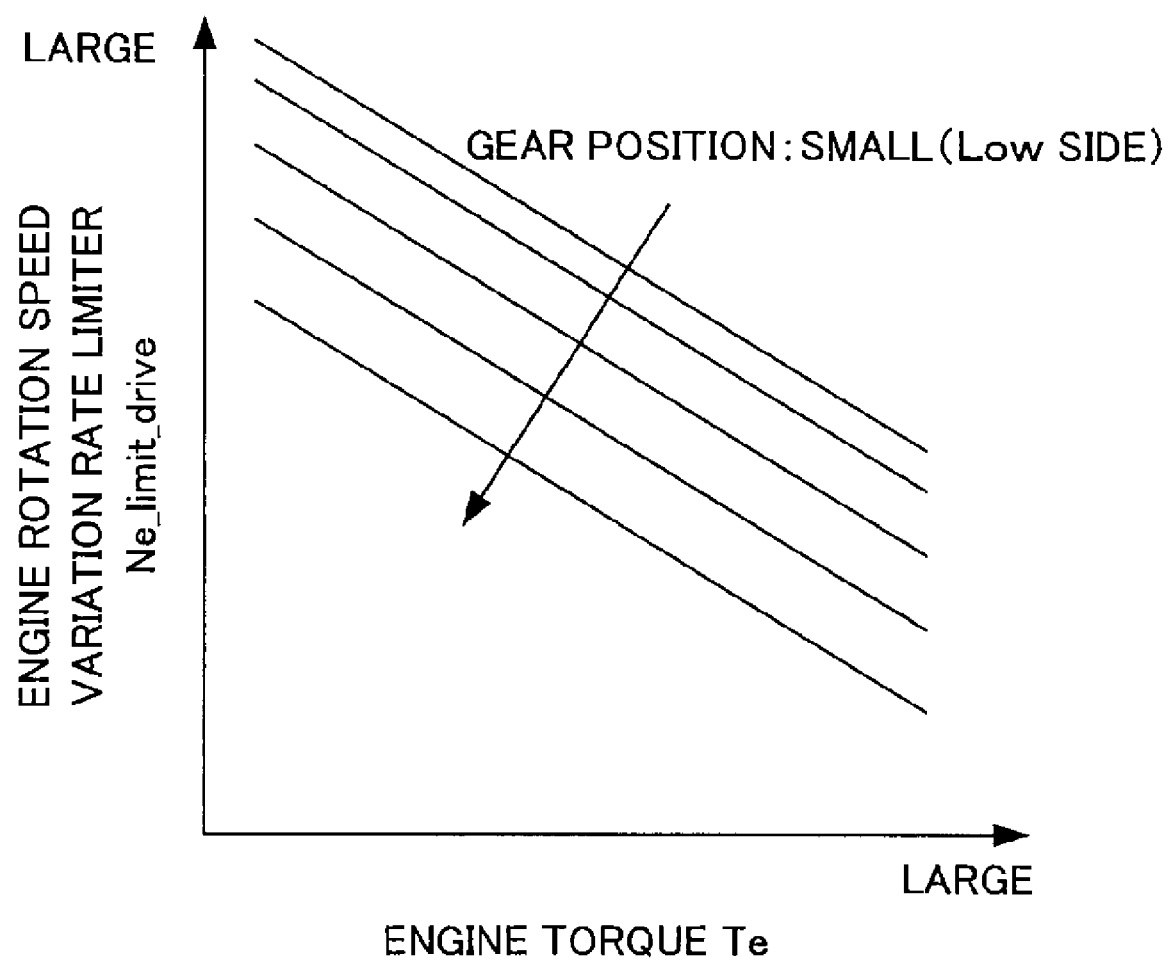
FIG. 8 is a map for calculating the engine rotation speed variation rate limiter according to this embodiment.

In a step S210, a non-shift engine rotation speed variation rate limiter (second engine rotation speed variation rate regulation value) Ne_limit_drive is calculated from the engine torque Te and the gear position on the basis of a map shown in FIG. 8. FIG. 8 is a map showing a relationship between the engine torque Te, the gear position, and the non-shift engine rotation speed variation rate limiter Ne_limit_drive. In FIG. 8, the engine rotation speed variation rate limiter Ne_limit_drive decreases as the engine torque Te increases. Further, the engine rotation speed variation rate limiter Ne_limit_drive decreases as the gear position decreases, or in other words as the gear position becomes the Low side.

An increase rate of the turbine rotation speed Nt increases as the engine torque Te increases or as the current gear position decreases (becomes the Low side), and therefore, by reducing the engine rotation speed variation rate limiter Ne_limit_drive, the slip amount of the lockup clutch 8 can be converged with a predetermined slip condition when a shift is not performed smoothly once the shift is complete. As a result, shock generation can be suppressed.

In a step S211, the input rotation speed InpREV input into the automatic transmission 3 is added to the base target slip amount Tslip_base_drive calculated in the step S209. Further, the added value is subtracted from the target engine rotation speed Ne_target' of the previous control routine, whereby a second variation amount Nedlt_base_drive, which is an amount of variation in the engine rotation speed per unit time at the base target slip amount Tslip_base_drive, is calculated.

In a step S212, the smaller of the engine rotation speed variation rate limiter Ne_limit_drive calculated in the step S210 and the second variation amount Nedlt_base_drive calculated in the step S211 is calculated as the engine rotation speed variation amount Ne_dlt.

Next, the target engine rotation speed Ne_target of the current control routine is calculated by subtracting the engine rotation speed variation amount Ne_dlt from the target engine rotation speed Ne_target' of the previous control routine. Further, the target engine rotation speed Ne_target calculated in the current control routine is stored as the target engine rotation speed Ne_target' for use in the next control routine.

Further, an upper limit target slip amount (fourth target slip amount) Tslip_limit_drive is calculated by subtracting the input rotation speed InpREV input into the automatic transmission 3 from the target engine rotation speed Ne_target.

In a step S213, the larger of the upper limit target slip amount Tslip_limit_drive and the base target slip amount Tslip_base_drive is set as a non-shift target slip amount (second final target slip amount) Tslip.

In this embodiment, the upper limit target slip amount Tslip_limit_drive takes a larger value than the base target slip amount Tslip_base_drive immediately after the end of an upshift, and therefore the upper limit target slip amount Tslip_limit_drive is selected as the target slip amount Tslip. In a steady condition, which is attained once a sufficient amount of time has elapsed following completion of the upshift, the base target slip amount Tslip_base_drive takes a larger value than the upper limit target slip amount Tslip_limit_drive, and therefore the base target slip amount Tslip_base_drive is selected as the target slip amount Tslip.

In this embodiment, the upper limit target slip amount Tslip_limit_drive is set as the target slip amount Tslip, and therefore rapid engagement of the lockup clutch 8, which occurs when the slip amount varies rapidly, can be suppressed, thereby suppressing shock generation. Furthermore, fluctuation in the engine rotation speed Ne and the turbine rotation speed Nt can be suppressed.

The target slip amount Tslip in the driving condition is set through the control described above.

Figure 9:
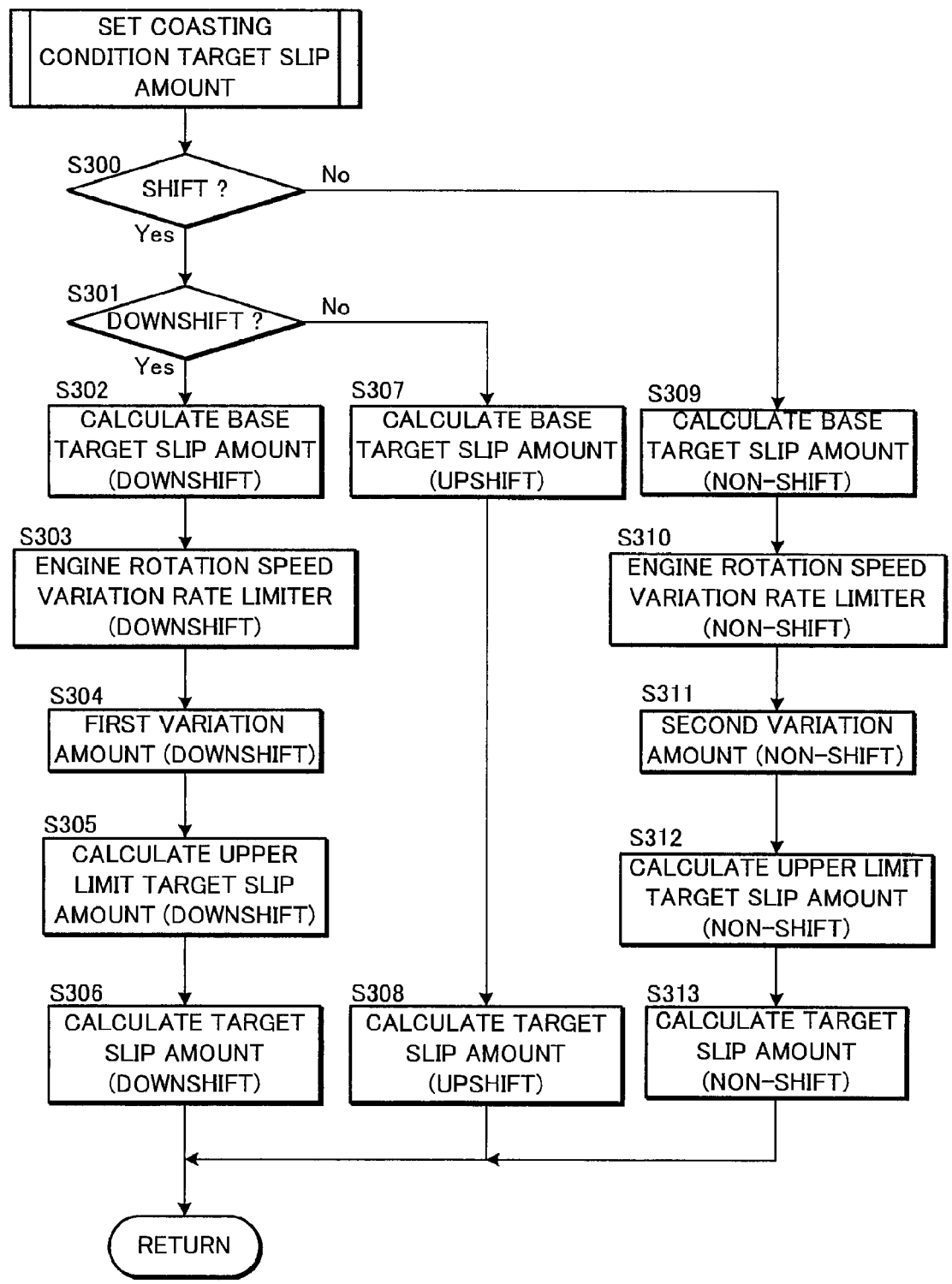
FIG. 9 is a flowchart for setting a target slip amount of a coasting condition in the flowchart of FIG. 2.

A method of setting the target slip amount in the coasting condition in the step S102 will now be described using the flowchart in FIG. 9.

In a step S300, a determination is made as to whether or not a shift is underway in the automatic transmission 3. When a shift is underway, the routine advances to a step S301, and when a shift is not underway, the routine advances to a step S309.

In the step S301, a determination is made as to whether or not the shift is a downshift. When the shift is a downshift, the routine advances to a step S302. When the shift is not a downshift, or in other words, when the shift is an upshift, the routine advances to a step S307.

Figure 10:
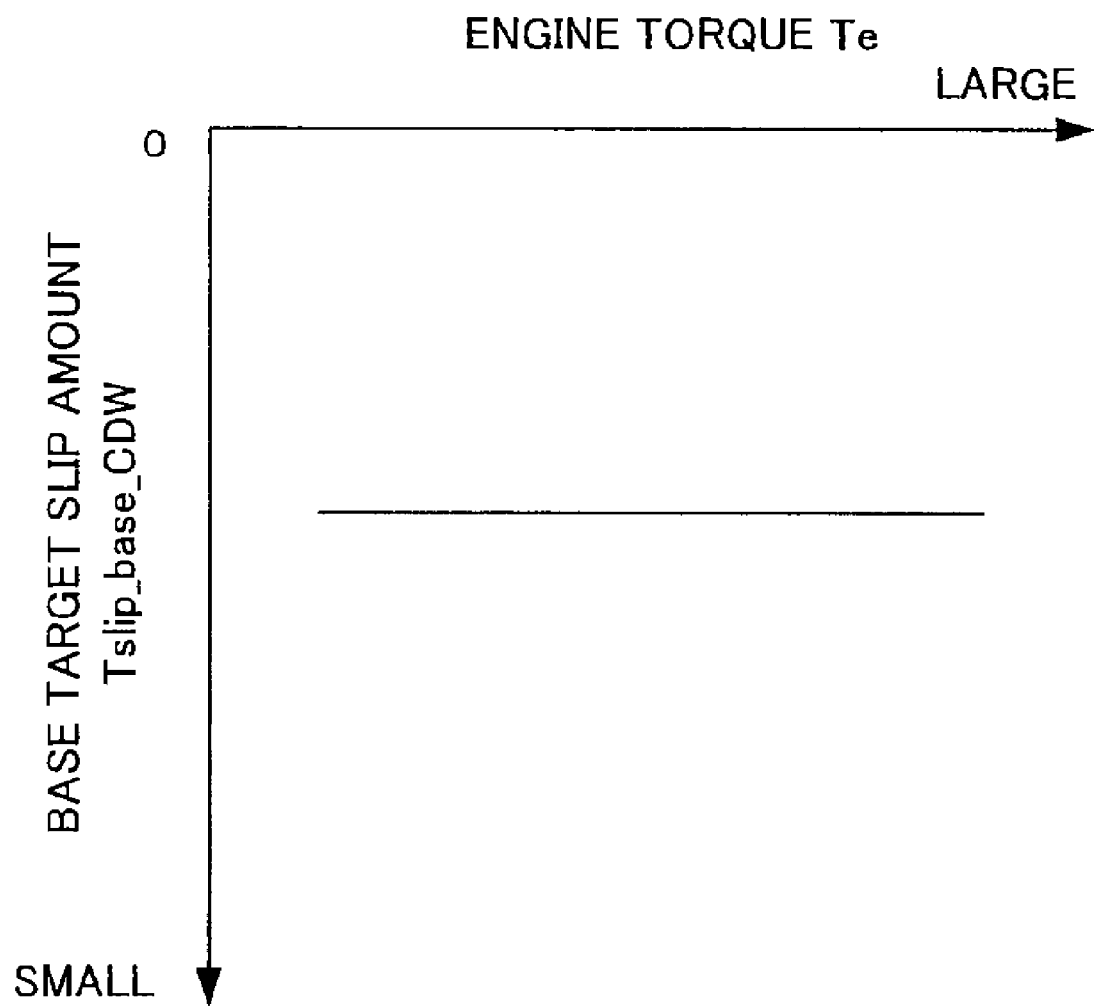
FIG. 10 is a map for calculating the base target slip amount according to this embodiment.

In the step S302, a downshift base target slip amount (first target slip amount) Tslip_base_CDW is calculated from a map shown in FIG. 10. FIG. 10 is a map showing a relationship between the engine torque Te and the base target slip amount Tslip_base_CDW. In FIG. 10, the base target slip amount Tslip_base_CDW takes a fixed value regardless of the magnitude of the engine torque Te.

Figure 11:
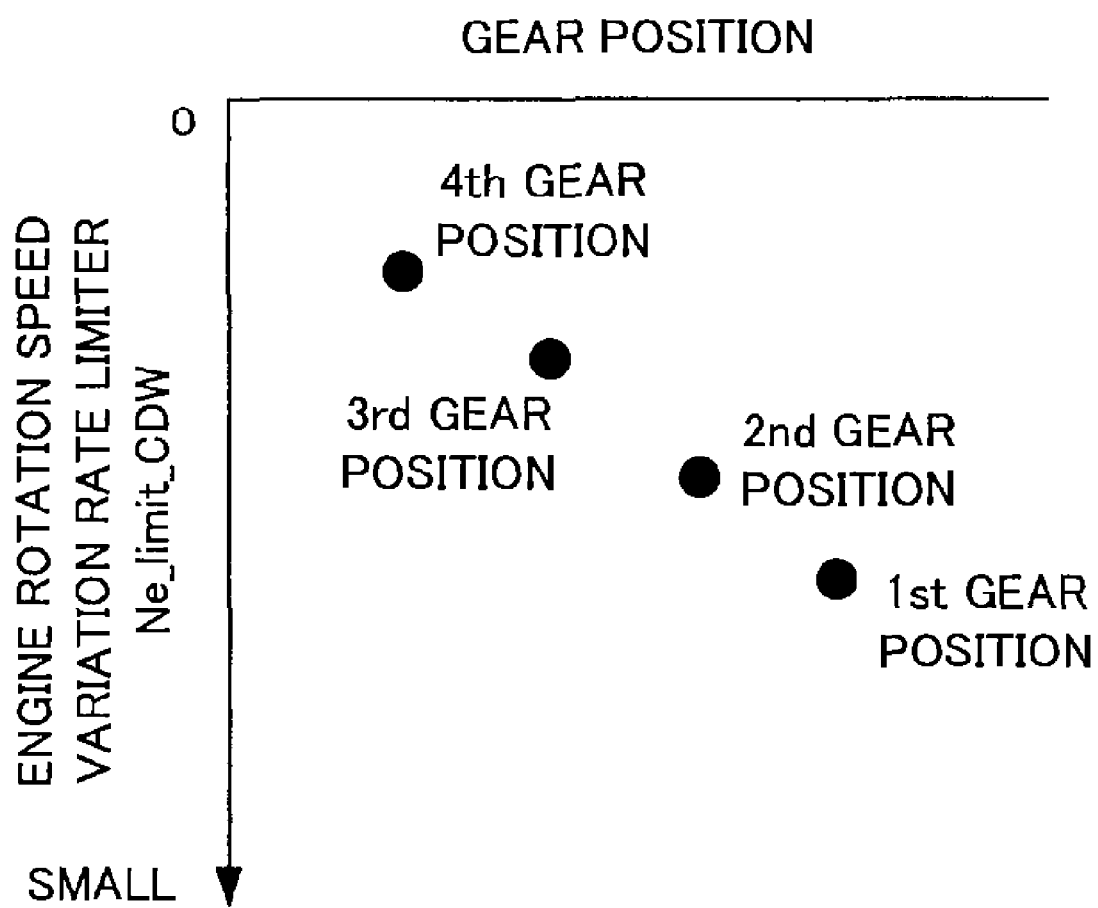
FIG. 11 is a map for calculating the engine rotation speed variation rate limiter according to this embodiment.

In a step S303, a downshift engine rotation speed variation rate limiter (first engine rotation speed variation rate regulation value) Ne_limit_CDW is calculated on the basis of the gear position following the shift from a map shown in FIG. 11. FIG. 11 is a map showing a relationship between the gear position and the engine rotation speed variation rate limiter Ne_limit_CDW. In FIG. 11, the engine rotation speed variation rate limiter Ne_limit_CDW decreases as the gear position decreases.

An increasing direction of the engine rotation speed Ne is set as a negative direction of the engine rotation speed variation rate. Therefore, during a downshift in the coasting condition, the engine rotation speed variation rate limiter Ne_limit_CDW increases in the negative direction as the gear position following the shift decreases (shifts to the Low side). By reducing the engine rotation speed variation rate limiter Ne_limit_CDW as the gear position decreases, the slip amount can be reduced quickly once the shift is complete.

In a step S304, the input rotation speed InpREV input into the automatic transmission 3 is added to the base target slip amount Tslip_base_CDW calculated in the step S302. Further, the added value is subtracted from the target engine rotation speed Ne_target' of the previous control routine, whereby a first variation amount Nedlt_base_CDW, which is an amount of variation in the engine rotation speed per unit time at the base target slip amount Tslip_base_CDW, is calculated.

In a step S305, the larger of the engine rotation speed variation rate limiter Ne_limit_CDW calculated in the step S303 and the first variation amount Nedlt_base_CDW calculated in the step S304, or in other words the one having a smaller absolute value, is calculated as the engine rotation speed variation amount Ne_dlt.

Next, the target engine rotation speed Ne_target of the current control routine is calculated by subtracting the engine rotation speed variation amount Ne_dlt from the target engine rotation speed Ne_target' of the previous control routine. Further, the target engine rotation speed Ne_target calculated in the current control routine is stored as the target engine rotation speed Ne_target' for use in the next control routine.

Further, an upper limit target slip amount (second target slip amount) Tslip_limit_CDW is calculated by subtracting the input rotation speed InpREV input into the automatic transmission 3 from the target engine rotation speed Ne_target.

In a step S306, the smaller of the upper limit target slip amount Tslip_limit_CDW and the base target slip amount Tslip_base_CDW, or in other words the one having a larger absolute value, is set as the target slip amount (final target slip amount) Tslip.

In this embodiment, the base target slip amount Tslip_base_CDW takes a smaller value than the upper limit target slip amount Tslip_limit_CDW between issuance of a shift command and the actual start of the gear position switch, and therefore the base target slip amount Tslip_base_CDW is selected as the target slip amount Tslip. When the gear position switch actually starts, the upper limit target slip amount Tslip_limit_CDW takes a smaller value than the base target slip amount Tslip_base_CDW, and therefore the upper limit target slip amount Tslip_limit_CDW is selected as the target slip amount Tslip.

When a downshift is performed in the coasting condition, the engine rotation speed Ne varies in accordance with variation in the turbine rotation speed Nt. Accordingly, racing may occur in the engine rotation speed. Hence, when the gear position is changed in this embodiment, the occurrence of rapid racing in the engine rotation speed can be suppressed by setting the target slip amount Tslip at the upper limit target slip amount Tslip_limit_CDW.

Figure 12:
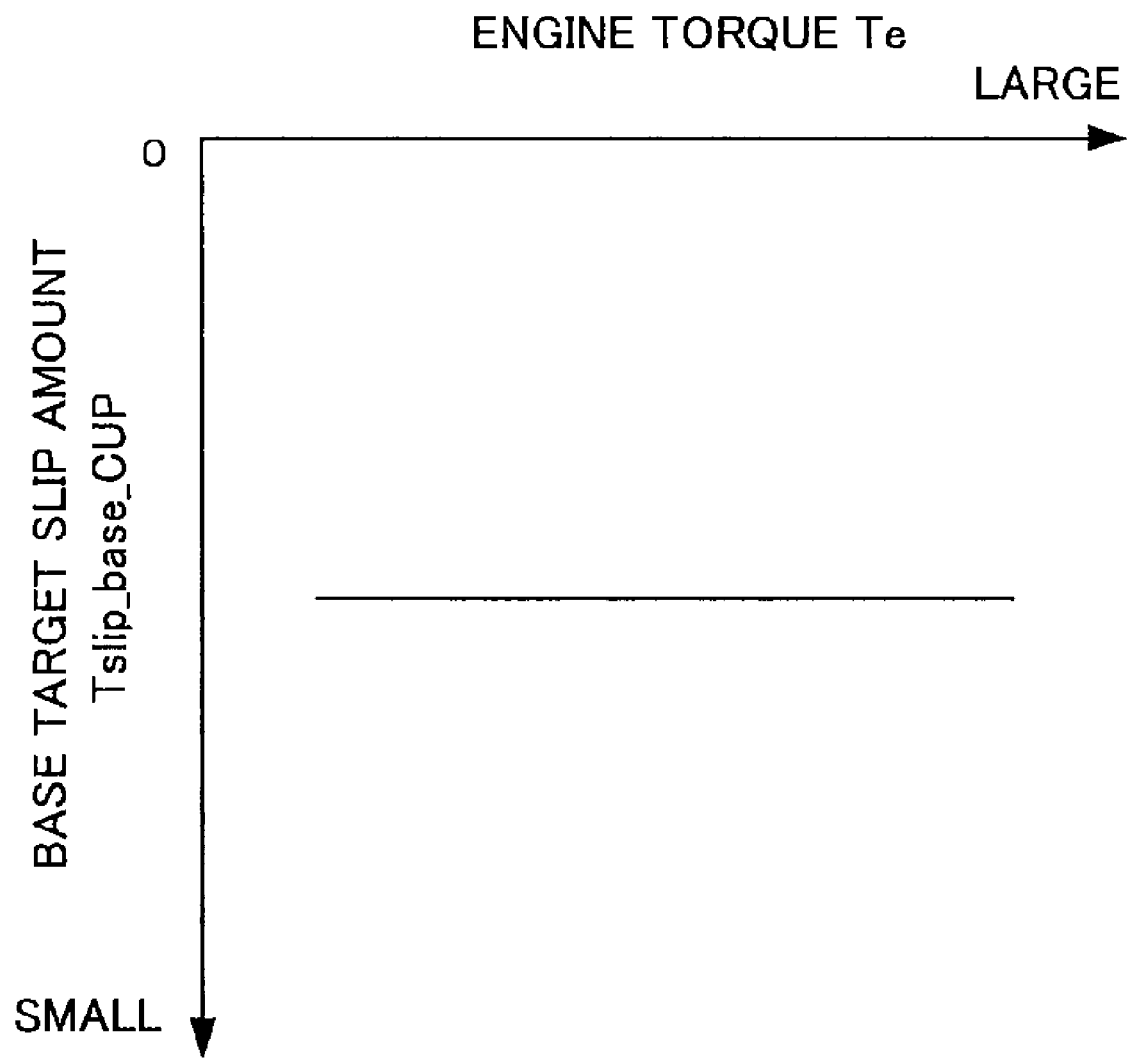
FIG. 12 is a map for calculating the base target slip amount according to this embodiment.

When it is determined that the shift is an upshift in the step S301, an upshift base target slip amount (first target slip amount) Tslip_base_CUP is calculated in the step S307 from a map shown in FIG. 12. FIG. 12 is a map showing a relationship between the engine torque Te and the base target slip amount Tslip_base_CUP. In FIG. 12, the base target slip amount Tslip_base_CUP takes a fixed value regardless of the magnitude of the engine torque Te. The base target slip amount Tslip_base_CUP has a larger absolute value than the absolute value of the target slip amount immediately before the shift.

In a step S308, the base target slip amount Tslip_base_CUP calculated in the step S307 is set as the target slip amount (first final target slip amount) Tslip during an upshift.

Figure 13:
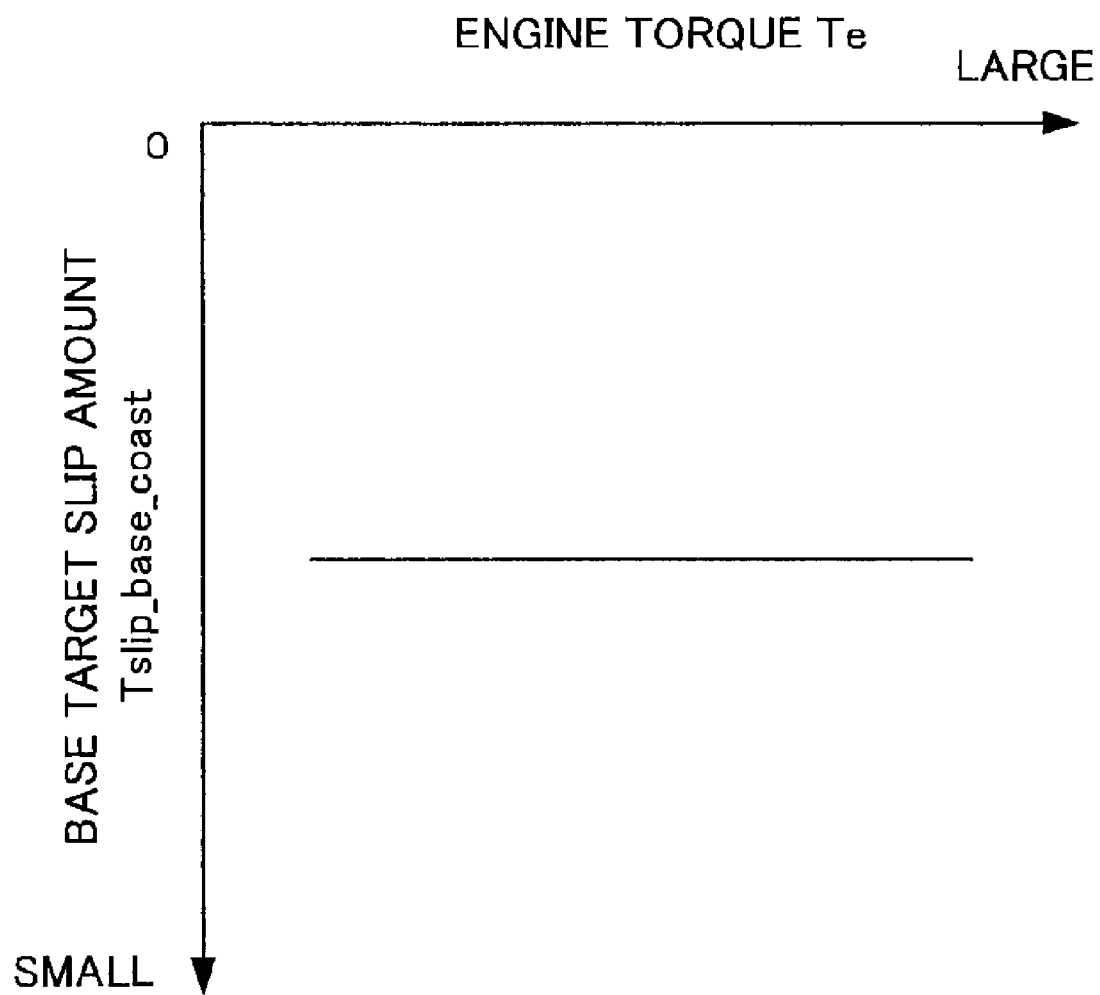
FIG. 13 is a map for calculating the base target slip amount according to this embodiment.

When it is determined in the step S300 that a shift is not underway, a base target slip amount (third target slip amount) Tslip_base_coast for a case in which a shift is not underway is calculated in the step S309 on the basis of a map shown in FIG. 13. FIG. 13 is a map showing a relationship between the engine torque Te and the base target slip amount Tslip_base_coast. In FIG. 13, the base target slip amount Tslip_base_coast takes a fixed value regardless of the magnitude of the engine torque Te.

Figure 14:
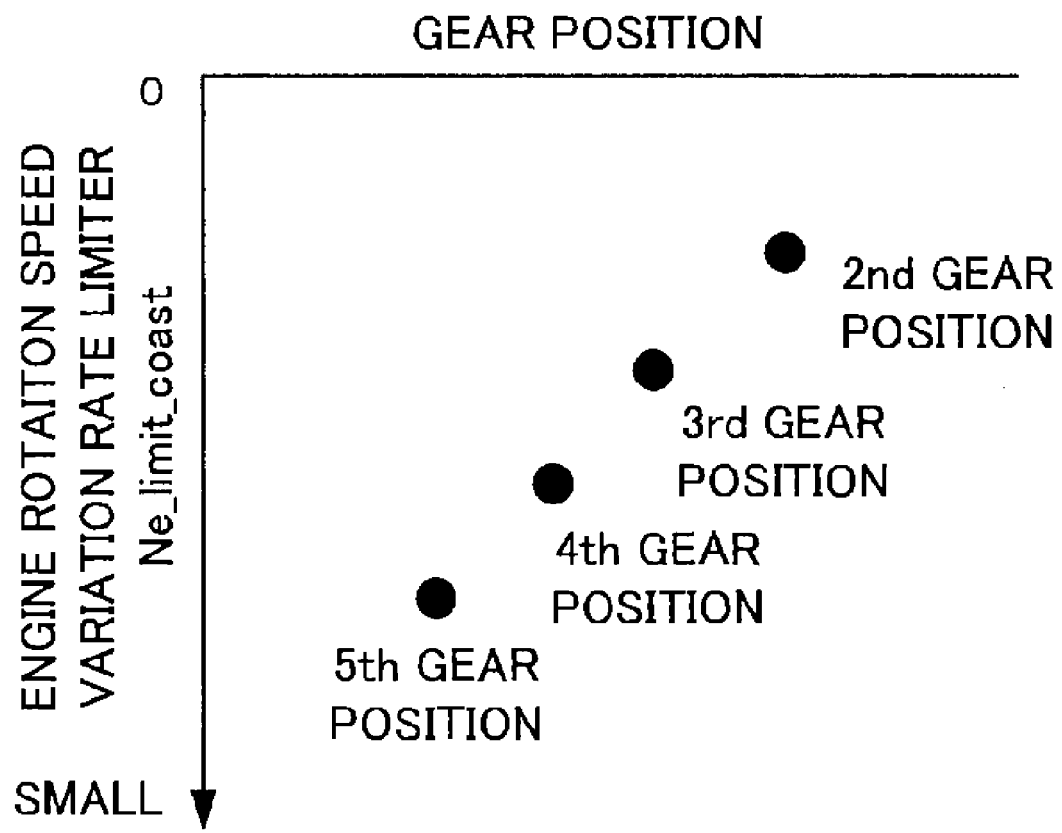
FIG. 14 is a map for calculating the engine rotation speed variation rate limiter according to this embodiment.

In a step S310, an engine rotation speed variation rate limiter (second engine rotation speed variation rate regulation value) Ne_limit_coast for a case in which a shift is not underway is calculated from the gear position on the basis of a map shown in FIG. 14. FIG. 14 is a map showing a relationship between the gear position and the engine rotation speed variation rate limiter Ne_limit_coast. In FIG. 14, the engine rotation speed variation rate limiter Ne_limit_coast increases as the gear position decreases.

A decrease rate of the turbine rotation speed Nt increases as the current gear position decreases, and therefore, by increasing the engine rotation speed variation rate limiter Ne_limit_coast, or in other words causing the engine rotation speed variation rate limiter Ne_limit_coast to approach zero, the slip amount of the lockup clutch 8 can be converged smoothly.

In a step S311, the input rotation speed InpREV input into the automatic transmission 3 is added to the base target slip amount Tslip_base_coast calculated in the step S309. Further, the added value is subtracted from the target engine rotation speed Ne_target' of the previous control routine, whereby a second variation amount Nedlt_base_coast, which is an amount of variation in the engine rotation speed per unit time at the base target slip amount Tslip_base_coast, is calculated.

In a step S312, the larger of the engine rotation speed variation rate limiter Ne_limit_coast calculated in the step S310 and the second variation amount Nedlt_base_coast calculated in the step S311, or in other words the one having a smaller absolute value, is calculated as the engine rotation speed variation amount Ne_dlt.

Next, the target engine rotation speed Ne_target of the current control routine is calculated by subtracting the engine rotation speed variation amount Ne_dlt from the target engine rotation speed Ne_target' of the previous control routine. Further, the target engine rotation speed Ne_target calculated in the current control routine is stored as the target engine rotation speed Ne_target' for use in the next control routine.

Further, an upper limit target slip amount (fourth target slip amount) Tslip_limit_coast is calculated by subtracting the input rotation speed InpREV input into the automatic transmission 3 from the target engine rotation speed Ne_target.

In a step S313, the smaller of the upper limit target slip amount Tslip_limit_coast and the base target slip amount Tslip_base_coast, or in other words the one having a larger absolute value, is set as the target slip amount (second final target slip amount) Tslip.

In this embodiment, the upper limit target slip amount Tslip_limit_coast takes a smaller value (a larger value in the negative direction) than the base target slip amount Tslip_base_coast immediately after the end of a downshift, and therefore the upper limit target slip amount Tslip_limit_coast is selected as the target slip amount Tslip. In a steady condition, which is attained once a sufficient amount of time has elapsed following completion of the downshift, the base target slip amount Tslip_base_coast takes a smaller value than the upper limit target slip amount Tslip_limit_coast, and therefore the base target slip amount Tslip_base_coast is selected as the target slip amount Tslip.

In this embodiment, the upper limit target slip amount Tslip_limit_coast is set as the target slip amount Tslip, and therefore rapid engagement of the lockup clutch 8, which occurs when the slip amount varies rapidly, can be suppressed, thereby suppressing shock generation. Furthermore, fluctuation in the engine rotation speed Ne and the turbine rotation speed Nt can be suppressed.

The target slip amount Tslip in the coasting condition is set through the control described above.

Next an upshift and a downshift in the driving condition and an upshift and a downshift in the coasting condition according to this embodiment will be described using time charts shown in FIGS. 15 to 18. In FIGS. 15 to 18, dot-dash lines indicate variation when the target slip amount is fixed.

Figure 15:
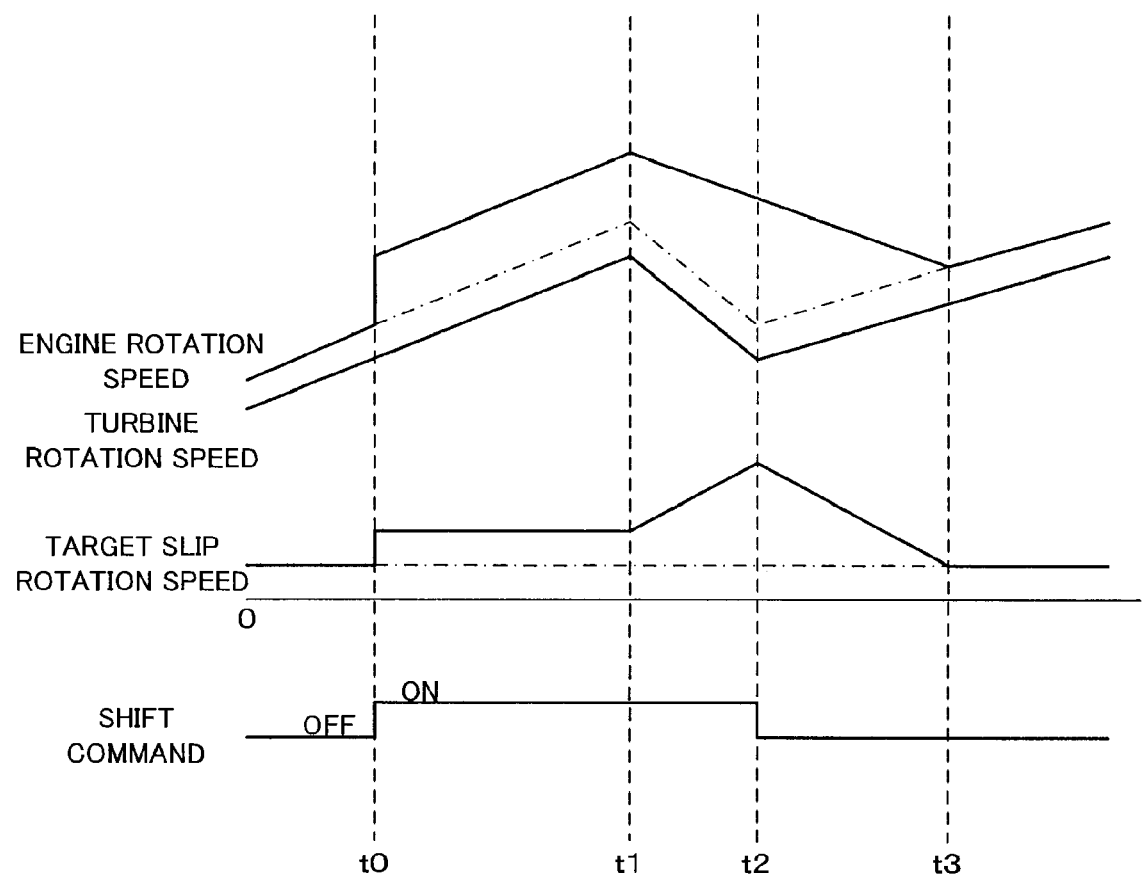
FIG. 15 is a time chart showing lockup clutch control according to this embodiment.

FIG. 15 is a time chart of an upshift in the driving condition.

At a time t0, a shift command is issued and the shift starts. Here, the upper limit target slip amount Tslip_limit_DUP is set as the target slip amount Tslip. Accordingly, the target slip amount Tslip increases beyond the target slip amount immediately before the shift command is issued. In other words, a deviation between the engine rotation speed Ne and the turbine rotation speed Nt increases.

At a time t1, gear position change begins. Therefore, the base target slip amount Tslip_base_DUP, which has a larger absolute value than the absolute value of the upper limit target slip amount Tslip_limit_DUP, is set as the target slip amount Tslip. Accordingly, the target slip amount Tslip increases further.

When an upshift is performed in the driving condition, the engine rotation speed Ne varies in accordance with variation in the turbine rotation speed Nt, and therefore a rapid fall in the engine rotation speed Ne may occur during the shift. In this embodiment, the target slip amount Tslip is increased during an upshift in the driving condition. In so doing, variation in the engine rotation speed Ne during the shift can be made smooth, and as a result, a rapid fall in the engine rotation speed Ne can be suppressed.

Further, since the variation direction (rotation speed increase) of the engine rotation speed before change of the gear position begins differs from the variation direction (rotation speed decrease) of the engine rotation speed once change of the gear position has begun, the driver may experience an unpleasant sensation. In this embodiment, the target slip amount Tslip is set at the upper limit target slip amount Tslip_limit_DUP once gear position change has begun, and therefore the unpleasant sensation experienced by the driver can be reduced.

At a time t2, gear position change ends, and thus the shift is completed. When the shift is completed, the upper limit target slip amount Tslip_limit_drive is set as the target slip amount Tslip. Accordingly, the target slip amount Tslip decreases gradually. As a result, rapid engagement of the lockup clutch 8, which may occur when the slip amount decreases rapidly, can be prevented, and rotation speed variation (fluctuation) in the engine rotation speed Ne and the turbine rotation speed Nt can be suppressed.

At a time t3, when a sufficient amount of time has elapsed following shift completion, the base target slip amount Tslip_base_drive* becomes larger than the upper limit target slip amount Tslip_limit_drive. Therefore, the base target slip amount Tslip_base_drive is set as the target slip amount Tslip.

Figure 16:
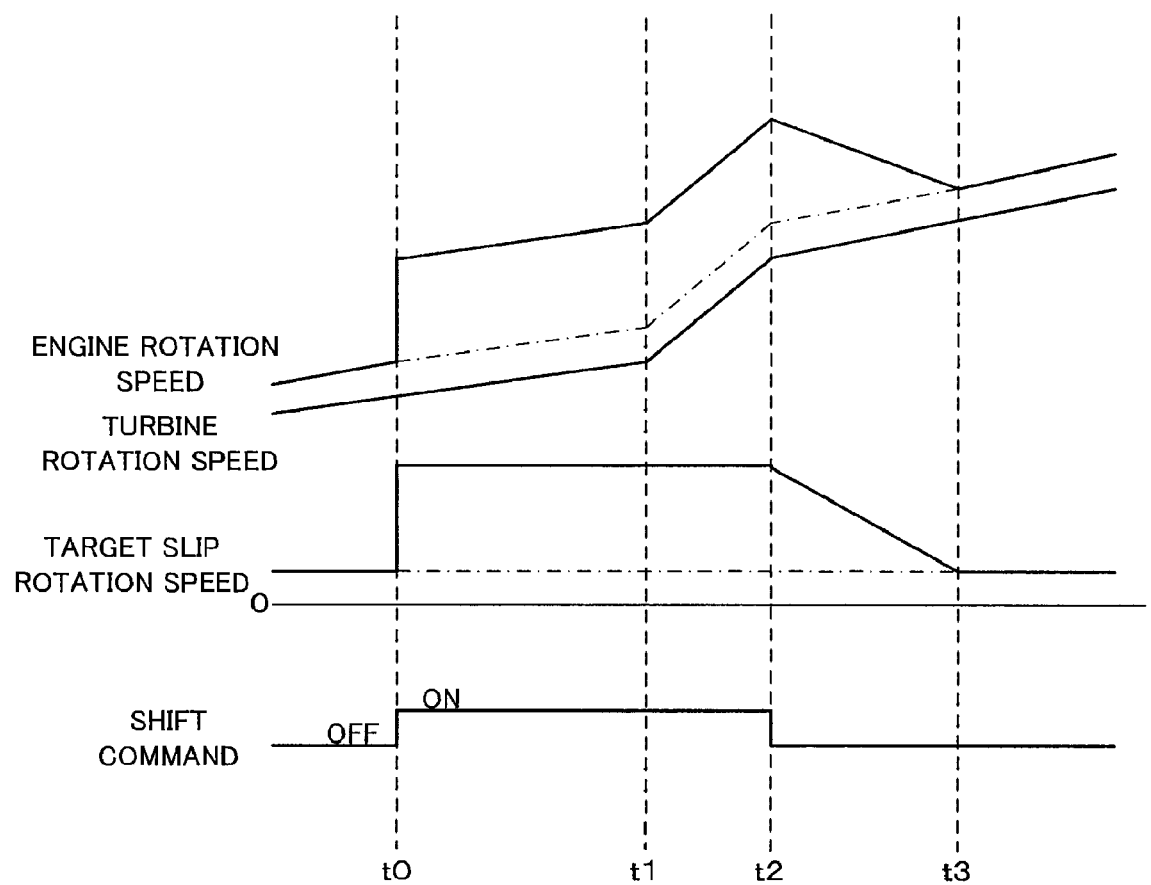
FIG. 16 is a time chart showing lockup clutch control according to this embodiment.

FIG. 16 is a time chart showing a downshift in the driving condition.

At a time t0, a shift command is issued and the shift starts. Here, the base target slip amount Tslip_base_DDW is set as the target slip amount Tslip.

At a time t1, gear position change begins. At a time t2, gear position change ends, and thus the shift is completed. The target slip amount Tslip remains fixed throughout this period.

During a downshift in the driving condition, the target slip amount Tslip is set to be larger as the throttle opening TVO increases. In so doing, shift shock occurring during the shift can be reduced.

When the shift is completed at the time t2, the upper limit target slip amount Tslip_limit_drive is set as the target slip amount Tslip, whereupon the target slip amount Tslip gradually decreases.

At a time t3, when a sufficient amount of time has elapsed following shift completion, the base target slip amount Tslip_base_drive becomes larger than the upper limit target slip amount Tslip_limit_drive. Therefore, the base target slip amount Tslip_base_drive is set as the target slip amount Tslip.

Figure 17:
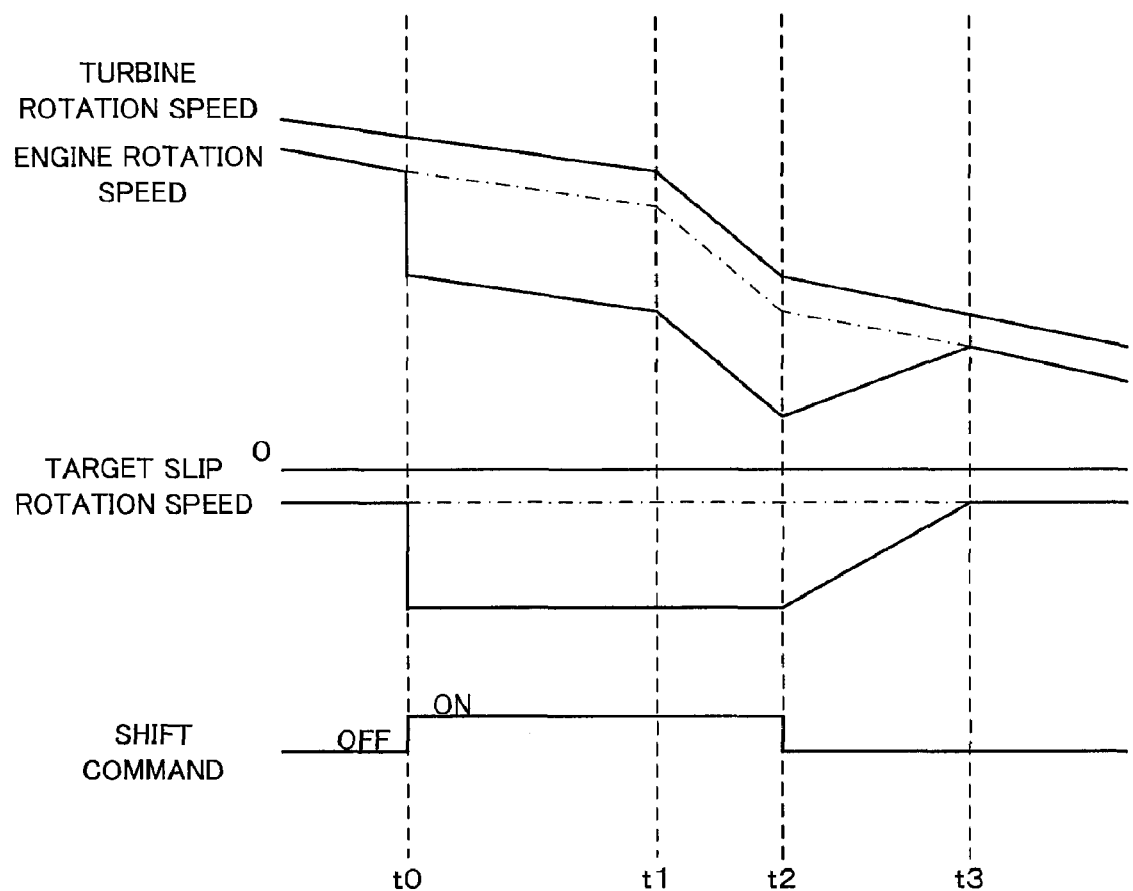
FIG. 17 is a time chart showing lockup clutch control according to this embodiment.

FIG. 17 is a time chart showing an upshift in the coasting condition.

At a time t0, a shift command is issued and the shift starts. Here, the base target slip amount Tslip_base_CUP is set as the target slip amount Tslip. Accordingly, the absolute value of the target slip amount Tslip increases (the target slip amount Tslip increases in the negative direction) beyond the target slip amount immediately before the shift command is issued. In other words, the deviation between the turbine rotation speed Nt and the engine rotation speed Ne increases.

At a time t1, gear position change begins. At a time t2, gear position change ends, and thus the shift is completed. The base target slip amount Tslip_base_CUP is set as the target slip amount Tslip throughout this period.

When the shift is completed in the automatic transmission 3 at the time t2, the upper limit target slip amount Tslip_limit_coast is set as the target slip amount Tslip. Accordingly, the target slip amount Tslip increases (approaches zero) gradually.

At a time t3, when a sufficient amount of time has elapsed following shift completion, the base target slip amount Tslip_base_coast is set as the target slip amount Tslip.

Figure 18:
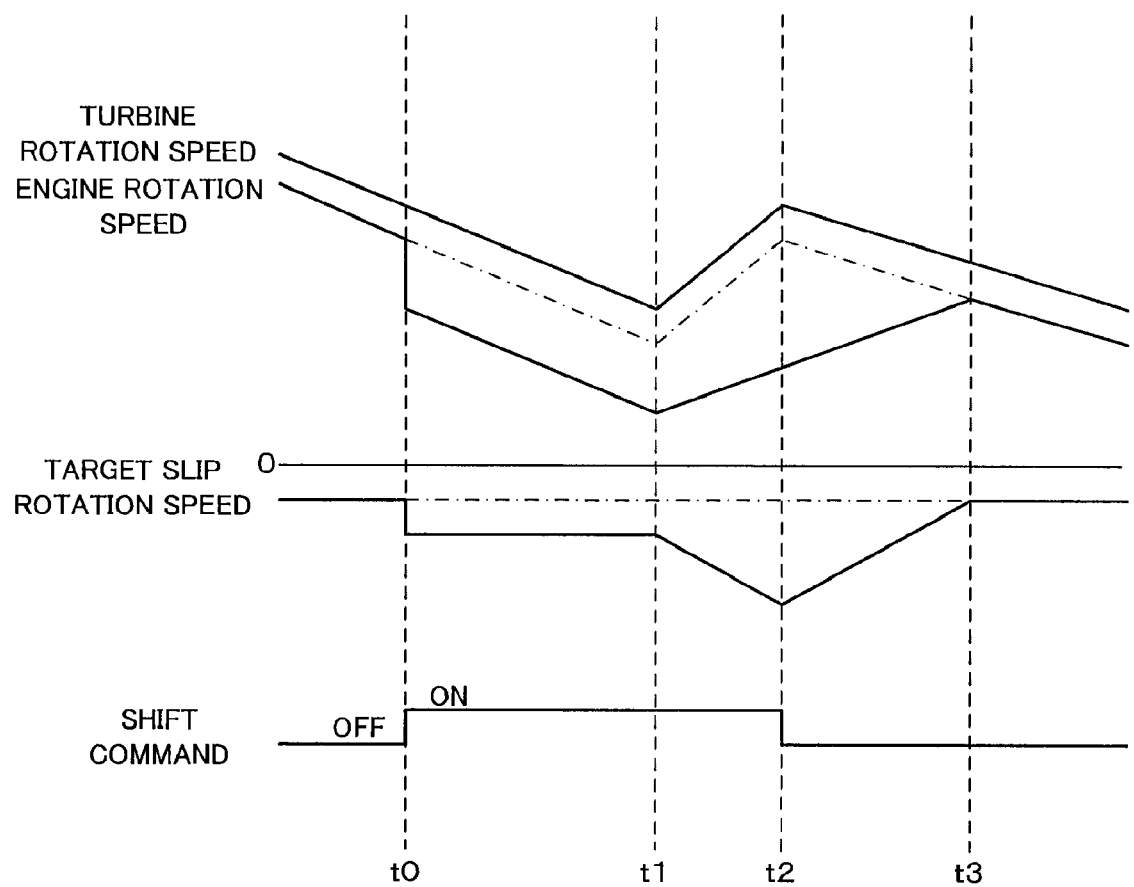
FIG. 18 is a time chart showing lockup clutch control according to this embodiment.

FIG. 18 is a time chart showing a downshift in the coasting condition.

At a time t0, a shift command is issued and the shift starts. Here, the base target slip amount Tslip_base_CDW is set as the target slip amount Tslip. Accordingly, the absolute value of the target slip amount Tslip increases beyond the target slip amount immediately before the shift command is issued.

At a time t1, gear position change begins. Hence, the base target slip amount Tslip_base_CDW, which has a larger absolute value than the absolute value of the upper limit target slip amount Tslip_limit_CDW, is calculated as the target slip amount Tslip. Accordingly, the absolute value of the target slip amount Tslip increases further. In other words, the target slip amount Tslip increases in the negative direction.

When a downshift is performed in the coasting condition, the absolute value of the target slip amount Tslip is increased, and therefore rapid racing in the engine rotation speed Ne can be suppressed during the shift.

Further, by setting the target slip amount Tslip at the upper limit target slip amount Tslip_limit_CDW once gear position change has begun, the unpleasant sensation experienced by the driver can be reduced.

At a time t2, gear position change ends, and thus the shift is completed. When the shift is completed, the upper limit target slip amount Tslip_limit_coast is set as the target slip amount Tslip. Accordingly, the absolute value of the target slip amount Tslip decreases (the target slip amount Tslip approaches zero).

At a time t3, when a sufficient amount of time has elapsed following shift completion, the absolute value of the base target slip amount Tslip_base_coast becomes smaller than the upper limit target slip amount Tslip_limit_coast. Accordingly, the base target slip amount Tslip_base_coast is set as the target slip amount Tslip.

In this embodiment, when a shift is not underway in the driving condition, the base target slip amount Tslip_base_drive is set on the basis of the engine torque Te and the turbine rotation speed Nt. Further, when a shift is not underway in the coasting condition, the base target slip amount Tslip_base_coast is set at a predetermined value. However, this invention is not limited thereto, and the base target slip amount Tslip_base_drive, Tslip_base_coast may be set at zero during travel in a high speed gear position (the High side), for example.

Further, the engine rotation speed variation rate limiter may be set in accordance with the vehicle speed.

Moreover, in this embodiment, when a shift is not underway in the driving condition, the base target slip amount Tslip_base_drive is calculated on the basis of the engine torque Te and the turbine rotation speed Nt. Further, when a shift is not underway in the coasting condition, the base target slip amount Tslip_base_coast is set at a fixed value. However, this invention is not limited thereto, and the base target slip amount Tslip_base_drive, Tslip_base_coast may be set at zero during travel in a high speed gear position, i.e. when the gear position is on the High side, for example.

Furthermore, in the step S305 of this embodiment, for example, the engine rotation speed variation rate limiter Ne_limit_CDW and the first variation amount Nedlt_base_CDW are compared and the larger thereof is calculated as the engine rotation speed variation amount Ne_dlt. However, this invention is not limited thereto, and instead, respective absolute values of the engine rotation speed variation rate limiter Ne_limit_CDW and the first variation amount Nedlt_base_CDW may be compared, whereupon the smaller thereof is calculated as the engine rotation speed variation amount Ne_dlt.

Further, in this embodiment, the engine rotation speed variation rate limiter Ne_limit_DUP is set in accordance with the map shown in FIG. 5 such that the engine rotation speed variation rate limiter Ne_limit_DUP increases as the gear position at the start of the shift decreases and increases as the gear position following the shift increases. However, this invention is not limited thereto, and the engine rotation speed variation rate limiter Ne_limit_DUP may be set using a map according to which the engine rotation speed variation rate limiter Ne_limit_DUP increases as a position ratio between the gear position at the start of the shift and the gear position following the shift increases.

Further, in the steps S201, S203, S210, S302, S307 and S309, the throttle opening TVO may be used instead of the engine torque Te.

Effects of this embodiment of the invention will now be described.

In this embodiment, during a shift in the automatic transmission 3, a base target slip amount having a larger absolute value than the target slip amount immediately before the shift is calculated. Further, the engine rotation speed variation rate limiter is calculated on the basis of the operating conditions of the vehicle, and the upper limit target slip amount is calculated on the basis of the engine rotation speed variation rate limiter. The base target slip amount or the upper limit target slip amount is then set as the target slip amount.

When an upshift is performed in the driving condition or a downshift is performed in the coasting condition at this time, the upper limit target slip amount (Tslip_limit_DUP, Tslip_limit_CDW) is set as the target slip amount Tslip from the start to the end of the gear position change. Thus, rapid racing or a rapid fall in the engine rotation speed Ne can be suppressed during the gear position change. Moreover, shift shock can be reduced.

Further, when an upshift is performed in the driving condition or a downshift is performed in the coasting condition, the variation direction of the engine rotation speed Ne immediately before gear position change differs from the variation direction of the engine rotation speed Ne during the gear position change, and the variation direction of the engine rotation speed Ne during the gear position change differs from the variation direction of the engine rotation speed Ne following the gear position change. Hence, when variation in the engine rotation speed Ne increases, the unpleasant sensation experienced by the driver increases. In this embodiment, the unpleasant sensation experienced by the driver can be reduced by reducing variation in the engine rotation speed Ne during the gear position change.

Further, when a downshift is performed in the driving condition or an upshift is performed in the coasting condition, the base target slip amount (Tslip_base_DDW, Tslip_base_CUP) is set as the target slip amount Tslip during the shift. Thus, shift shock occurring during the shift can be suppressed.

When an upshift is performed in the driving condition or a downshift is performed in the coasting condition, whichever of the base target slip amount (Tslip_base_DUP, Tslip_base_CDW) and the upper limit target slip amount (Tslip_limit_DUP, Tslip_limit_CDW) has the larger absolute value is set as the target slip amount Tslip from the start to the end of the gear position change. Thus, rapid racing or a rapid fall in the engine can be suppressed during the gear position change.

When an upshift is performed in the driving condition or a downshift is performed in the coasting condition, the upper limit target slip amount (Tslip_limit_DUP, Tslip_limit_CDW) is calculated on the basis of whichever of the engine rotation speed variation rate limiter (Ne_limit_DUP, Ne_limit_CDW) and the first variation amount (Nedlt_base_DUP, Nedlt_base_CDW) has a smaller absolute value. Therefore, when an upshift is performed in the driving condition and when a downshift is performed in the coasting condition, rapid racing or a rapid fall in the engine can be suppressed. Moreover, shift shock can be reduced.

When a shift is not underway, whichever of the base target slip amount (Tslip_base_drive, Tslip_base_coast) and the upper limit target slip amount (Tslip_limit_drive, Tslip_limit_coast) has the larger absolute value is set as the target slip amount Tslip. Hence, the slip amount can be reduced gradually once the shift is complete, thereby suppressing rapid engagement of the lockup clutch 8, which occurs when the slip amount varies rapidly, and as a result, shock occurring due to rapid engagement can be suppressed. Moreover, fluctuation in the engine rotation speed Ne and the turbine rotation speed Nt can be suppressed.

When a shift is not underway, the upper limit target slip amount (Tslip_limit_drive, Tslip_limit_coast) is calculated on the basis of whichever of the engine rotation speed variation rate limiter (Ne_limit_drive, Ne_limit_coast) and the second variation amount (Nedlt_base_drive, Nedlt_base_coast) has the smaller absolute value. Hence, rapid engagement of the lockup clutch 8 following completion of the shift can be suppressed, and as a result, shock occurring due to rapid engagement can be suppressed. Moreover, fluctuation in the engine rotation speed Ne and the turbine rotation speed Nt can be suppressed.

When a shift is not underway in the driving condition, muffled noise can be suppressed by increasing the base target slip amount Tslip_base_drive as the engine torque Te increases or as the turbine rotation speed Nt decreases.

When a shift is not underway in the driving condition, the absolute value of the engine rotation speed variation rate limiter Ne_limit_drive is reduced as the engine torque Te increases or as the current gear position becomes the Low side. In other words, the engine rotation speed Ne is caused to vary gently. In so doing, the slip amount of the lockup clutch 8 can be converged smoothly.

When a shift is not underway in the coasting condition, the absolute value of the engine rotation speed variation rate limiter Ne_limit_coast is reduced as the current gear position becomes the Low side. In so doing, the slip amount of the lockup clutch 8 can be converged smoothly.

When an upshift is performed in the driving condition, the base target slip amount Tslip_base_DUP is calculated to be larger as the engine torque Te increases. In so doing, shift shock can be reduced.

The engine rotation speed variation rate limiter (Ne_limit_DUP, Ne_limit_CDW) is calculated such that the absolute value of the engine rotation speed variation rate limiter (Ne_limit_DUP, Ne_limit_CDW) increases as the absolute value of the variation amount in the engine rotation speed corresponding to the shift increases. In so doing, the slip amount can be reduced quickly once the shift is complete, and as a result, the slip amount can be converged quickly.

When a downshift is performed in the driving condition, the base target slip amount Tslip_base_DDW is increased as the engine torque Te increases. In so doing, the lockup clutch 8 can be set in the slip condition reliably during the gear position change, and as a result, shift shock can be suppressed.

This invention is not limited to the embodiment described above, and naturally includes various modifications and improvements within the scope of the technical spirit thereof.

This application claims priority from Japanese Patent Application 2008-156973, filed Jun. 16, 2008, which is incorporated herein by reference in its entirety.

What is claimed is:

1. A torque converter control device for controlling a torque converter that is interposed between an engine and an automatic transmission and includes a lockup clutch, comprising:
   a traveling condition determining unit that determines whether a traveling condition of a vehicle corresponds to a driving condition or a coasting condition;
   a shift command determining unit that determines whether or not a shift is underway in the automatic transmission;
   a first target slip amount calculating unit that calculates a first target slip amount having a larger absolute value than an absolute value of a target slip amount of the torque converter immediately before a shift command is issued when a shift is underway in the automatic transmission;
   a first engine rotation speed variation rate regulation value calculating unit that calculates, on the basis of an operating condition of the vehicle, a first engine rotation speed variation rate regulation value, which is a regulation value of a variation amount in an engine rotation speed per unit time, when a shift is underway in the automatic transmission;
   a second target slip amount calculating unit that calculates a second target slip amount on the basis of the first engine rotation speed variation rate regulation value when a shift is underway in the automatic transmission;
   a first final target slip amount setting unit that sets the first target slip amount or the second target slip amount as a final target slip amount when a shift is underway in the automatic transmission; and
   a control unit that controls an engagement condition of the lockup clutch on the basis of the final target slip amount,
   wherein, when a gear position is changed to a High side in the driving condition and when the gear position is changed to a Low side in the coasting condition, the first final target slip amount setting unit sets the second target slip amount as the final target slip amount for a period extending from the start of gear ratio variation following issuance of a gear position change start command to the automatic transmission to completion of the gear position change, and when the gear position is changed to the Low side in the driving condition and when the gear position is changed to the High side in the coasting condition, the first final target slip amount setting unit sets the first target slip amount as the final target slip amount for a period extending from issuance of a change command to the automatic transmission to completion of the change.

2. The torque converter control device as defined in claim 1, wherein, when the gear position is changed to the High side in the driving condition and when the gear position is changed to the Low side in the coasting condition, the first final target slip amount setting unit sets whichever of the first target slip amount and the second target slip amount has a larger absolute value as the final target slip amount.

3. The torque converter control device as defined in claim 1, further comprising a first engine rotation speed variation amount calculating unit that calculates a first variation amount, which is a variation amount in the engine rotation speed per unit time, on the basis of the first target slip amount,
   wherein the second target slip amount calculating unit calculates the second target slip amount on the basis of whichever of the first engine rotation speed variation rate regulation value and the first variation amount has a smaller absolute value.

4. The torque converter control device as defined in claim 1, further comprising:
   a third target slip amount calculating unit that calculates a third target slip amount from the operating condition of the vehicle when a shift is not underway in the automatic transmission;
   a second engine rotation speed variation rate regulation value calculating unit that calculates, on the basis of the operating condition of the vehicle, a second engine rotation speed variation rate regulation value, which is a regulation value of the variation amount of the engine rotation speed per unit time, when a shift is not underway in the automatic transmission;
   a fourth target slip amount calculating unit that calculates a fourth target slip amount on the basis of the second engine rotation speed variation rate regulation value when a shift is not underway in the automatic transmission; and
   a second final target slip amount setting unit that sets whichever of the third target slip amount and the fourth target slip amount has a larger absolute value as the final target slip amount when a shift is not underway in the automatic transmission.

5. The torque converter control device as defined in claim 4, further comprising a second engine rotation speed variation amount calculating unit that calculates a second variation amount, which is a variation amount in the engine rotation speed per unit time, on the basis of the third target slip amount,
   wherein the fourth target slip amount calculating unit calculates the fourth target slip amount on the basis of whichever of the second engine rotation speed variation rate regulation value and the second variation amount has a smaller absolute value.

6. The torque converter control device as defined in claim 4, wherein the third target slip amount calculating unit calculates the third target slip amount such that when the traveling condition corresponds to the driving condition, the third target slip amount increases as an engine torque increases or as a turbine rotation speed decreases.

7. The torque converter control device as defined in claim 4, wherein the second engine rotation speed variation rate regulation value calculating unit calculates the second engine rotation speed variation rate regulation value such that when the traveling condition corresponds to the driving condition, the absolute value of the second engine rotation speed variation rate regulation value decreases as the engine torque increases or as the gear position becomes the Low side.

8. The torque converter control device as defined in claim 4, wherein the second engine rotation speed variation rate regulation value calculating unit calculates the second engine rotation speed variation rate regulation value such that when the traveling condition corresponds to the coasting condition, the absolute value of the second engine rotation speed variation rate regulation value decreases as the gear position becomes the Low side.

9. The torque converter control device as defined in claim 1, wherein the first target slip amount calculating unit calculates the first target slip amount such that when the traveling condition corresponds to the driving condition, the first target slip amount increases as the engine torque increases.

10. The torque converter control device as defined in claim 1, wherein the first engine rotation speed variation rate regulation value calculating unit calculates the first engine rotation speed variation rate regulation value such that the absolute value of the first engine rotation speed variation rate regulation value increases as an absolute value of the variation amount in the engine rotation speed increases in accordance with the gear position change.

11. The torque converter control device as defined in claim 1, wherein the first target slip amount calculating unit calculates the first target slip amount such that when the traveling condition corresponds to the driving condition and the gear position is changed to the Low side, the first target slip amount increases as the engine torque increases.

12. A control method for controlling a torque converter that is interposed between an engine and an automatic transmission and includes a lockup clutch, comprising:
  determining whether a traveling condition of a vehicle corresponds to a driving condition or a coasting condition;
  determining whether or not a shift is underway in the automatic transmission;
  calculating a first target slip amount having a larger absolute value than an absolute value of a target slip amount of the torque converter immediately before a shift command is issued when a shift is underway in the automatic transmission;
  calculating, on the basis of an operating condition of the vehicle, a first engine rotation speed variation rate regulation value, which is a regulation value of a variation amount in an engine rotation speed per unit time, when a shift is underway in the automatic transmission;
  calculating a second target slip amount on the basis of the first engine rotation speed variation rate regulation value when a shift is underway in the automatic transmission;
  setting the first target slip amount or the second target slip amount as a final target slip amount when a shift is underway in the automatic transmission; and
  controlling an engagement condition of the lockup clutch on the basis of the final target slip amount,
  wherein, when a gear position is changed to a High side in the driving condition and when the gear position is changed to a Low side in the coasting condition, the second target slip amount is set as the final target slip amount for a period extending from the start of gear ratio variation following issuance of a gear position change start command to the automatic transmission to completion of the gear position change, and
  when the gear position is changed to the Low side in the driving condition and when the gear position is changed to the High side in the coasting condition, the first target slip amount is set as the final target slip amount for a period extending from issuance of a change command to the automatic transmission to completion of the change.

13. A torque converter control device for controlling a torque converter that is interposed between an engine and an automatic transmission and includes a lockup clutch, comprising:
  traveling condition determining means for determining whether a traveling condition of a vehicle corresponds to a driving condition or a coasting condition;
  shift command determining means for determining whether or not a shift is underway in the automatic transmission;
  first target slip amount calculating means for calculating a first target slip amount having a larger absolute value than an absolute value of a target slip amount of the torque converter immediately before a shift command is issued when a shift is underway in the automatic transmission;
  first engine rotation speed variation rate regulation value calculating means for calculating, on the basis of an operating condition of the vehicle, a first engine rotation speed variation rate regulation value, which is a regulation value of a variation amount in an engine rotation speed per unit time, when a shift is underway in the automatic transmission;
  second target slip amount calculating means for calculating a second target slip amount on the basis of the first engine rotation speed variation rate regulation value when a shift is underway in the automatic transmission;
  first final target slip amount setting means for setting the first target slip amount or the second target slip amount as a final target slip amount when a shift is underway in the automatic transmission; and
  control means for controlling an engagement condition of the lockup clutch on the basis of the final target slip amount,
  wherein, when a gear position is changed to a High side in the driving condition and when the gear position is changed to a Low side in the coasting condition, the first final target slip amount setting means sets the second target slip amount as the final target slip amount for a period extending from the start of gear ratio variation following issuance of a gear position change start command to the automatic transmission to completion of the gear position change, and
  when the gear position is changed to the Low side in the driving condition and when the gear position is changed to the High side in the coasting condition, the first final target slip amount setting means sets the first target slip amount as the final target slip amount for a period extending from issuance of a change command to the automatic transmission to completion of the change.

* * * * *